(12) United States Patent
Otra

(10) Patent No.: US 11,409,129 B2
(45) Date of Patent: Aug. 9, 2022

(54) MODULAR EYEGLASS FRAME APPARATUS AND SYSTEM

(71) Applicant: Expression Frames LLC, Cumming, GA (US)

(72) Inventor: Vikranthi Otra, Cumming, GA (US)

(73) Assignee: Expression Frames LLC, Cumming, GA (US)

( * ) Notice: Subject to any disclaimer, the term of this patent is extended or adjusted under 35 U.S.C. 154(b) by 123 days.

(21) Appl. No.: 16/177,294

(22) Filed: Oct. 31, 2018

(65) Prior Publication Data
US 2019/0235272 A1 Aug. 1, 2019

Related U.S. Application Data

(60) Provisional application No. 62/579,698, filed on Oct. 31, 2017.

(51) Int. Cl.
*G02C 5/20* (2006.01)
*G02C 5/00* (2006.01)
*G02C 5/14* (2006.01)
*G02C 5/22* (2006.01)

(52) U.S. Cl.
CPC .............. *G02C 5/20* (2013.01); *G02C 5/006* (2013.01); *G02C 5/146* (2013.01); *G02C 5/2218* (2013.01); *G02C 2200/06* (2013.01); *G02C 2200/08* (2013.01)

(58) Field of Classification Search
CPC .... G02C 5/146; G02C 5/006; G02C 2200/06; G02C 2200/08; G02C 1/10; G02C 5/22–229; G02C 5/14–20; G02C 5/2218–2254; G02C 5/2263–229
USPC .............. 351/41, 63, 89, 93, 103, 105, 107, 351/111–123, 133–135, 140–153, 178
See application file for complete search history.

(56) References Cited

U.S. PATENT DOCUMENTS

| | | | | |
|---|---|---|---|---|
| 7,008,054 | B1* | 3/2006 | Kurtin | G02C 7/08 351/158 |
| 2008/0137028 | A1* | 6/2008 | Webb | G02C 1/04 351/106 |
| 2017/0075134 | A1* | 3/2017 | Chen | G02C 5/146 |
| 2017/0276958 | A1* | 9/2017 | Friedfeld | G02C 5/008 |
| 2017/0307903 | A1* | 10/2017 | Calilung | G02C 5/10 |
| 2019/0086689 | A1* | 3/2019 | Lin | G02C 5/146 |

* cited by examiner

*Primary Examiner* — Marin Pichler
*Assistant Examiner* — Alberto J Betancourt
(74) *Attorney, Agent, or Firm* — Bekiares Eliezer LLP

(57) ABSTRACT

Apparatus and systems related to modular eyeglass elements may be provided. A detachable temple may be detachably coupled to a lens assembly at a temple strut of the lens assembly via a locking mechanism. Locking mechanisms may include spring tab, spring lever, spring bar, snap-fit, spring latch, and other disclosed configurations.

14 Claims, 23 Drawing Sheets

MODULAR EYEGLASS FRAME APPARATUS AND SYSTEM

RELATED APPLICATION

Under provisions of 35 U.S.C. § 119(e), the Applicant claims the benefit of U.S. provisional application No. 62/579,698, filed Oct. 31, 2017, which is incorporated herein by reference. It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure relates generally to eyeglass frames. More specifically, various embodiments of the present disclosure relate to apparatus and systems providing interchangeability of eyeglass frames and/or temples.

BACKGROUND

Eyeglasses (which term can encompass all sorts of eyewear, including sunglasses) are a fact of life for a great number of people. Commonly, the entire eyeglass assembly is monolithic, not providing for customizing the temples (the arms that rest upon a wearer's ears) versus the lens assembly, or vice versa. It can be advantageous or desirable to provide such functionality, as where, for example, a user wishes to coordinate temple color with an outfit, don thematic temples in support of a sports team, or convert between athletic (e.g. elastic banded, adhering, functional, etc.) and professional (e.g. stylish, low profile, designer branded, etc.) configurations.

Therefore, there is a need for apparatus and systems, and improvements thereof, for modular eyeglass frames.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in their trademarks and copyrights included herein, and grants permission to reproduce the material only in connection with reproduction of the granted patent and for no other purpose.

Furthermore, the drawings and their brief descriptions below may contain text or captions that may explain certain embodiments of the present disclosure. This text is included for illustrative, non-limiting, explanatory purposes of certain embodiments detailed in the present disclosure. In the drawings.

BRIEF OVERVIEW

Figure 1:
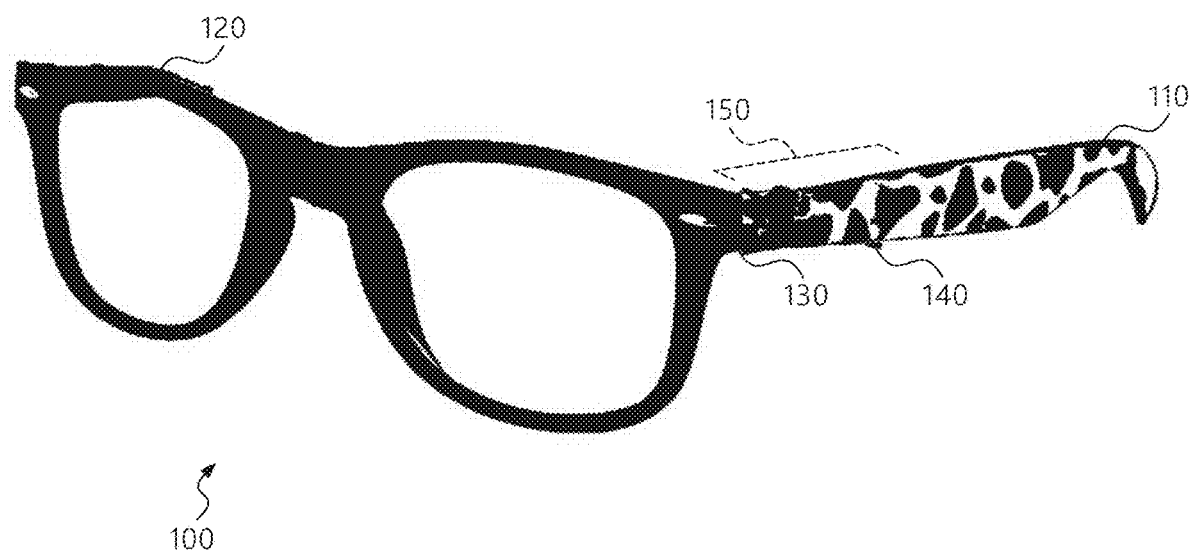
FIG. 1 illustrates a perspective view of a modular eyeglass frame, in accordance with various embodiments of the present disclosure.

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

An objective of the disclosed invention may be to facilitate the interchange of temples for eyeglasses.

Another objective of the disclosed invention may be to facilitate the interchange of frames for eyeglasses.

Yet another objective of the disclosed invention may be to provide a simple mechanical means for detaching temples from and reattaching temples to eyeglasses.

Still another objective of the disclosed invention may be to facilitate a diverse ecosystem of interchangeable temples and frames for eyeglasses, by providing a convenient and standardized interface to connect temples and frames together.

Further, an objective of the disclosed invention may be to facilitate the customization and personalization by eyeglass owners of their eyewear.

Further, another objective of the disclosed invention may be to allow for the retrofitting of non-modular eyeglasses with a mechanical interface that allows for interchanging temples and/or frames.

References to a modular eyeglass frame may include all known structural components related to eyeglasses including but not limited to:
  Modular eyeglass lens assembly comprising at least one of but not limited to rims, lenses, bifocals, end pieces, a bridge, nose pads, pad arms, eye wires, a brow bar, a top bar, a rim.
  Modular eyeglass components comprising at least one of but not limited to an end piece, a hinge, a screw, a temple, a temple tip, an earpiece, a frame rim, a tip, a head piece, a locker, a demo lens, a prescription lens, a bridge solder, a ptosis crutch, a spring hinge, a solder eyewire, a shorten eyewire, a silicone pad, an adjustable pad arm, a solder pad arm, a temple cover, a sunglass lens, an adjustable temple arm, a soft grip frame, a rubber protective layer, an ear grip, a curved temple tip.

In some instances, one or more of these terms may be used interchangeably to refer to one of these components individually or one or more of these components including the modular eyeglass frame collectively in this specification.

Embodiments of the present disclosure provide systems that may comprise, but are not limited to:
  Detachable temple assemblies;
  Modular eyeglass frames configured to receive and release detachable temples;
  Temple struts positioned on the modular eyeglass frames to couple with detachable temples;
  Hinged (allowing temple folding) and unhinged (fixed temple) configurations;
  Various coupling and locking modalities, including but not limited to:
  Spring mechanisms;
  Tabs;
  Levers;
  Bars;
  Latches;
  Ramps; and
  Channels.

Described below are various example modular eyeglass frame systems.

A first system may comprise a detachable temple assembly and an eyeglass lens assembly. In the first system, the temple assembly may comprise an internal cavity forming a channel along at least a portion of its length. A temple strut, which may be affixed to, for example, an eyeglass lens assembly, may be configured to be inserted into the internal cavity. The temple strut may further comprise a spring tab spring tab configured to lock the temple strut in place within the internal cavity of the temple assembly, thereby engaging the temple assembly to the eyeglass lens assembly. The spring tab may comprise an "open" state and a "depressed" state. In the "open" state, the spring tab may protrude from a surface of the strut at a range of first angles relative to the surface, thereby creating a ramped surface on one side of the strut. In the "depressed" state, the spring tab may be depressed inward toward the interior of the strut, such that, for example, it forms a range of second angles relative to the surface of the strut, which may be less than the first angle, and may encompass zero degree and negative angles.

The temple strut may be configured to be inserted into a channel of the detachable temple assembly via a first opening to the internal cavity leading to the channel at approximately its second angle. Whereas the tab at the open state may not fit within the internal cavity due to the ramp formation at the range of first angles, the strut, in its depressed state, at the range of second angles, may be insertable into the internal cavity of the temple assembly (via the first opening). Once inserted in its depressed state, the channel walls formed by the internal cavity of the temple assembly may cause the depressed state at the range of second angles of the tab to be maintained when the temple strut is within the channel (and thus permitting temple strut to fit within the channel of the temple assemble). As the temple strut slides through the channel of the temple assembly toward a final coupled position, the spring tab may slide along the channel—still depressed inward at the second angle and ready to spring outward to the first angle. The final coupled position may comprise a stopping means, such as, but not limited to, for example, a back wall of the internal cavity, that is designed to prevent the temple strut from being inserted into the channel beyond a certain depth into the internal cavity of the temple assemble.

Still consistent with embodiments of the present disclosure, the temple assembly may comprise a second opening relative to the final coupled position within the channel. When arriving at the final coupled position, the spring tab may spring outward, through the second opening, to the open state at the range of first angles, such that the first angle of the ramp formation of the spring tab prevents the temple strut from fitting back into the internal cavity of the temple assembly, thereby "locking" the temple strut within the temple assembly from egress back out of the channel. Then, to disengage the components (i.e., detach the temple assembly from the eyeglass lens assemble), the spring tab may require a user to affirmatively engage (i.e., press inward into the depressed state) the spring tab.

A second system may comprise a detachable temple assembly, an eyeglass lens assembly, and a spring clip assembly configured to lock the temple assembly to the eyeglass lens assembly. The detachable temple assembly may comprise an internal cavity comprising a first portion and a second portion. The first portion may form a channel along at least a portion of its length. The temple assemble may further comprise an opening at an end for receiving a temple strut. Furthermore, the temple assembly may comprise a second opening at a surface exposing at least partially, each of the first portion and the second portion of the internal cavity. The temple assembly may subdivide the internal cavity into the first portion and the second portion with a wall serving as an end of channel.

The eyeglass lens assembly may comprise the temple strut. The temple strut may be configured to be inserted into the channel of the temple assembly via the first opening to the first portion of the internal cavity until an end of the strut it reaches, at least approximately, the wall subdividing the internal cavity. In this way, the strut may be blocked, by the wall, from being inserted any deeper into the internal cavity, and rest at a final position adjacent to the wall.

Accordingly, the final coupled position may be relative to a stopping means, such as, but not limited to, for example, a back wall of the internal cavity, that is designed to prevent the temple strut from being inserted into the channel beyond a certain depth into the internal cavity of the temple assemble. Once at its final position, at least a portion of the surface of the temple strut may be exposed from the second opening of the temple assembly. At least a portion of the exposed surface may comprise a carve out, or indentation, serving as a locking mechanism receptacle.

Referring back to the temple assembly, a pin may be configured so as to attach the spring clip assembly to the temple assembly. The pin may traverse the temple assemble through a hole of the temple assemble. The pin may further traverse a hole in the spring clip assembly. In this way, the pin may secure the spring clip assembly to the temple assembly. The hole in the spring clip assembly may be positioned relative to a center point of the spring clip assembly, thereby enabling the spring clip assembly to function as a lever and fulcrum about the location of the pin. A clip may be positioned relative to a first edge of the lever, and a spring or spring-like mechanism (collectively referred to as the "spring mechanism") may be positioned relative to a second edge of the lever. The spring mechanism may be positioned such that it fits into the second portion of the internal cavity of the temple assembly when the spring clip assembly is pinned to the temple assembly. The clip may be positioned such that it fits into the locking mechanism receptacle when the spring clip assembly is pinned to the temple assembly and the temple strut of the eyeglass lens assembly is inserted into the channel of the temple assembly. In this way, the clip may lock the temple strut in place within the internal cavity of the temple assembly, thereby engaging the temple assembly to the eyeglass lens assembly.

The spring mechanism may comprise a "closed" state and an "open" state. In the "closed" state, the spring clip assembly may cover both the first portion and the second portion of the internal cavity of the lens assembly. From the "closed" state, the spring mechanism may be depressed into the second portion of the internal cavity to enter into the "open" state. As a function of the fulcrum and lever design, the depression of the spring mechanism at the first edge of the lever may cause the clip at the second edge of the lever to elevate, about the location of the fulcrum (e.g., the pin). The resulting elevation of the clip may result in the decoupling of the clip from the receptacle mechanism of the temple strut, thereby allowing for the temple strut to unlock from the lens assembly. Once the spring mechanism is released, it extends back against the second portion of the internal cavity, and pivots about the fulcrum (e.g., the pin) back into the "closed" state.

A third system may comprise a detachable temple assembly, an eyeglass lens assembly, and a spring clip assembly configured to lock the temple assembly to the eyeglass lens assembly. In the third system, the temple assembly may comprise the second portion of the internal cavity and the hole for the pin of the aforementioned second system. However, the third system may have the temple strut configured to the temple assembly in place of the first portion of the internal cavity of the second system. The temple strut of the third system, like in the second system, may comprise a carve out, or indentation, serving as a locking mechanism receptacle.

In turn, the eyeglass assembly of the third system may be configured much like the first portion of the temple assembly in the second system, comprising an internal cavity forming channel to receive the temple strut of the temple assembly, a back wall, and an opening that exposes the channel. The opening may be designed to expose the locking mechanism receptacle of the temple strut from a received temple assembly. In this way, the spring clip assembly may latch into the locking mechanism receptacle to lock the temple assembly to the eyeglass lens assembly when the temple strut of the temple assembly is inserted into the internal cavity of the eyeglass assembly.

A fourth system may comprise a detachable temple assembly and an eyeglass lens assembly. The temple assembly may comprise an internal cavity forming a channel along at least a portion of its length. The temple assembly may further comprise a spring lever situated, at least in part, relative to an end of the channel. A temple strut may have a latching protrusion that can slide along the channel as the temple strut slides through the internal cavity of the temple assembly. The latching protrusion may engage the spring lever as it nears the end of the channel, locking the temple assembly components into place relative to an eyeglass lens assembly. Decoupling may involve engaging an opposite end of the lever from the latched end, such that the lever pivots about a point and disengages from the latching protrusion.

A fifth system may comprise a detachable temple assembly and an eyeglass lens assembly. In the fifth system, a temple strut configured to the lens assembly may comprise an internal cavity featuring a spring bar cavity and two distinct ramped elements: one with a curved apex dropoff ("tapered") and one with a sharper apex dropoff ("untapered"). The temple assembly may have a spring bar at its front (i.e. strut-engaging) end. The spring bar may have two distinct ends: one ramped in both forward and backward directions ("bidirectionally ramped") and one ramped only in the forward direction ("unidirectionally ramped"). The ends of the spring bar may be configured to interact in a particular orientation with respect to the ramps, for example the bidirectionally ramped end with the tapered ramp, and the unidirectionally ramped end with the untapered ramp. The components may releasably lock into place when the spring bar slides past the ramps into the spring bar cavity. The detachable temple may be dislodged by torqueing the detachable temple so as to slide the bidirectionally ramped end past the tapered ramp.

A sixth system may comprise a detachable temple assembly and an eyeglass lens assembly. In the sixth system, a detachable temple may have an internal cavity featuring a catch mechanism. A temple strut may feature a spring latch assembly. The detachable temple may slide over the temple strut into coupling position, wherein a latch (e.g. a hook) in the spring latch assembly may releasably engage the catch mechanism (e.g. a bar "catchable" by the hook). The spring latch assembly may be decoupled from the catch mechanism by engaging the release mechanism (e.g. a button that squeezes the spring).

In various embodiments that incorporate hinge and spring systems, different coupling and locking mechanisms may be employed. These systems may come in a wide variety of configurations and orientations, including snap-fit spring clips, spring-like (compressible) unibody hinges, complementary-shape hinge clips, and spring pivot mechanisms. Moreover, it should be understood that different terms may be used through the present disclosure as synonyms the same mechanism.

In various embodiments that incorporate latch systems, different coupling and locking mechanisms may be employed. These systems may come in a wide variety of configurations and orientations, including guide pin and latch mechanisms (which can include flexible unibody latches), snap-fit pivot latches and clasps, complementary-shape latch mechanisms, and nested latch mechanisms.

In various embodiments that incorporate other systems, different coupling and locking mechanisms may be employed. For example, a bolt-action system may employ a temple strut equipped with a cylindrical bolt member that can be inserted into (for example) a keyhole-shaped slide opening in a detachable temple, and then twisted into a locked configuration upon reaching coupling position. For another example, a modular eyeglass system may employ a snap-fit sliding lock mechanism that allows ingress and egress of a temple strut while switched into a first position, but preventing such movement while switched into a second position.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

DETAILED DESCRIPTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of stages of various processes or methods that are described herein are illustrative and not restrictive. Accordingly, it should be understood that, although stages of various processes or methods may be shown and described as being in a sequence or temporal order, the stages of any such processes or methods are not limited to being carried out in any particular sequence or order, absent an indication otherwise. Indeed, the stages in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "stage for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

I. Configurations

Consistent with embodiments of the present disclosure, system and apparatus for a modular eyeglass frame (or simply "modular frame") 100 may be provided. Modular frame 100 may be used to releasably affix a detachable temple (or simply "temple") 110 to a lens assembly 120. For the purposes of this disclosure, any description or depiction of components as being:

Oriented with respect to any component or direction;
Located internally, externally, or on the surface;
Affixed, connected, attached, coupled, or locked;
Present in a particular embodiment;
Ordered in a particular sequence of steps or stages;
is mutually interchangeable, reversible, reorderable, in any orientation, configuration, or combination thereof, including between and among embodiments.

FIG. 1 illustrates a perspective view of an example embodiment of modular frame 100. In this example, detachable temple 110 is shown coupled to lens assembly 120, which may be fixed in place by locking mechanism 140 (here, for example, a spring tab system). Not visible is the temple strut (or simply "strut") 150, which may be the point of connection between lens assembly 120 and detachable temple 110. In this example, detachable temple 110 may slide over temple strut 150 and lock into place via components of the locking mechanism present on both temple 110 and strut 150. The length of strut 150 may also provide support and stability to the overall assembled modular frame 100. Strut 150 may be attached to the lens assembly 120 at an attachment point 130; attachment point 130 may in some embodiments be a hinge mechanism.

Figure 2:
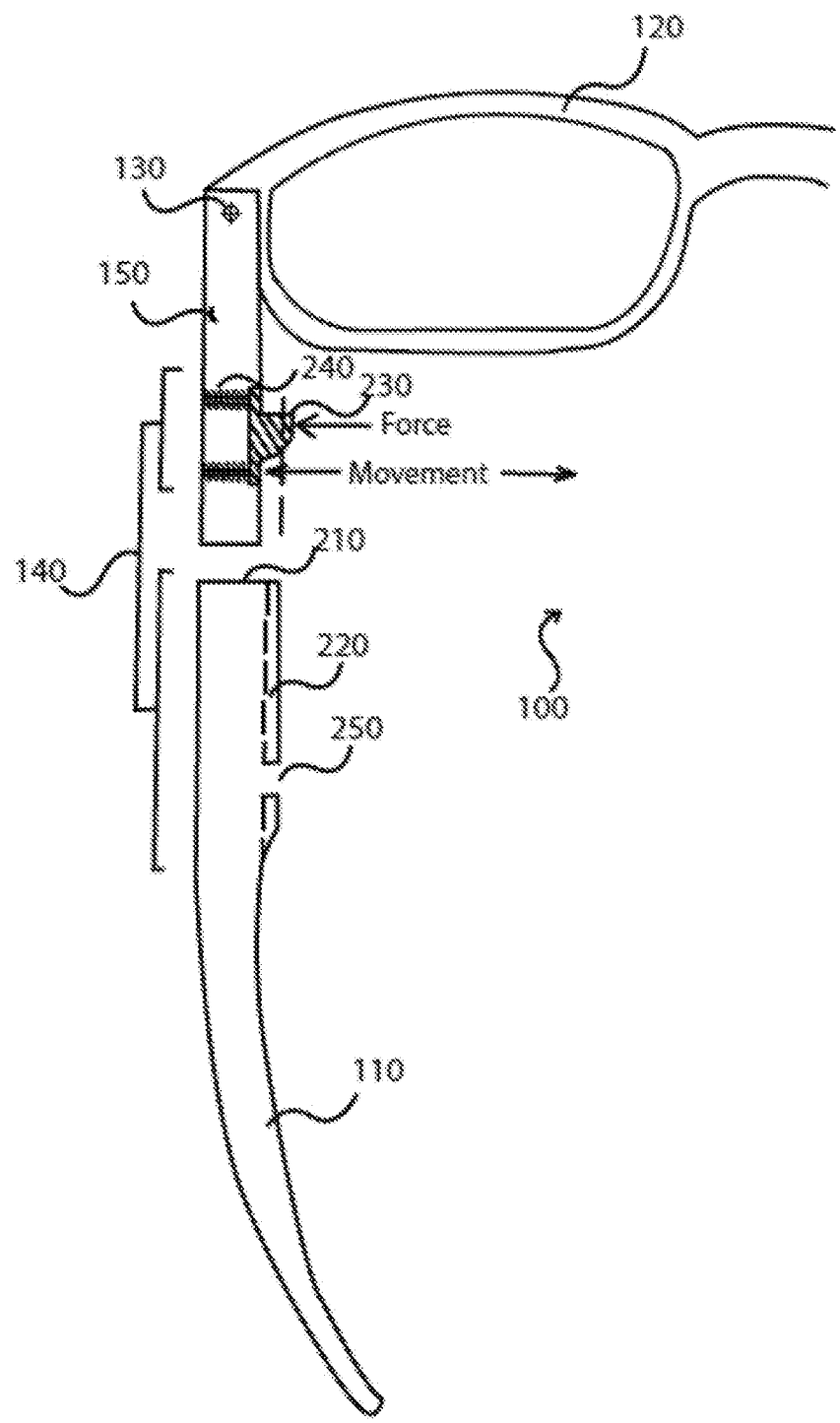
FIG. 2 illustrates a top view of a locking mechanism for a modular eyeglass frame, in accordance with various embodiments of the present disclosure.

FIG. 2 illustrates an example locking mechanism 140 for modular frame 100, consistent with various embodiments of the present disclosure. In this example, locking mechanism 140 may comprise, on strut 150: spring tab 230, attached at its base to springs 240; and on temple 110: axial channel 220 having channel opening 250. In this embodiment, modular frame 100 may couple together by inserting the posterior end of strut 150 into the slide opening 210 of temple 110, whereby spring tab 230 is depressed by the impingement of the walls of temple 110 onto its posterior-facing ramped surface, continuing along that direction of travel (wherein spring tab 230 slides along axial channel 220) until spring tab 230 springs outward through channel opening 250, releasably locking the components into place. Temple 110 may be detached from strut 150 by depressing inward the spring tab 230 until it's unramped anterior-facing surface clears the inner edge of the channel opening 250.

Figure 3:
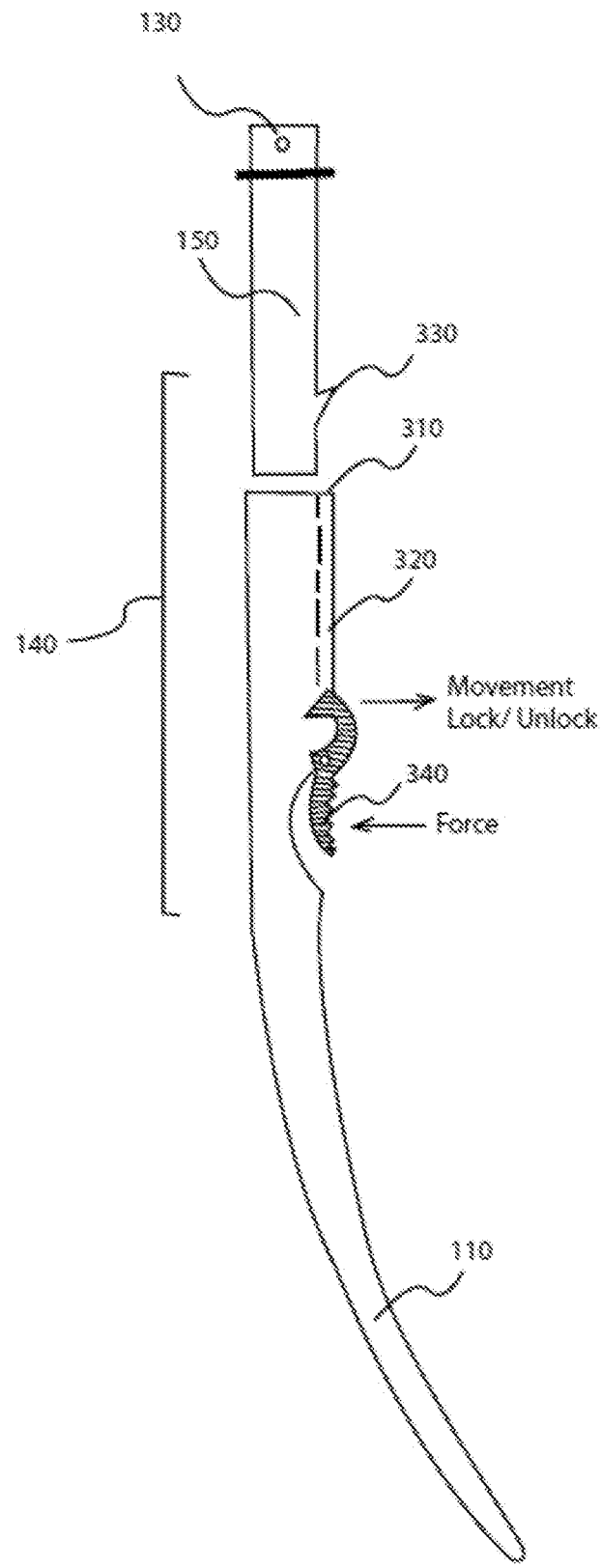
FIG. 3 illustrates a top view of another locking mechanism for a modular eyeglass frame, in accordance with various embodiments of the present disclosure.

FIG. 3 illustrates an example locking mechanism 140 for modular frame 100, consistent with various embodiments of the present disclosure. Locking mechanism 140 may comprise, on strut 150: latching protrusion 330; and on temple 110: axial channel 320 and spring lever 340. In this embodiment, modular frame 100 may couple together by inserting the posterior end of strut 150 into the slide opening 310 of temple 110, continuing along that direction of travel until the latching protrusion 330 engages a latch element of spring latch 340, releasably locking the components into place. Temple 110 may be detached from strut 150 by engaging the spring lever 340 about a pivot element.

Figure 4:
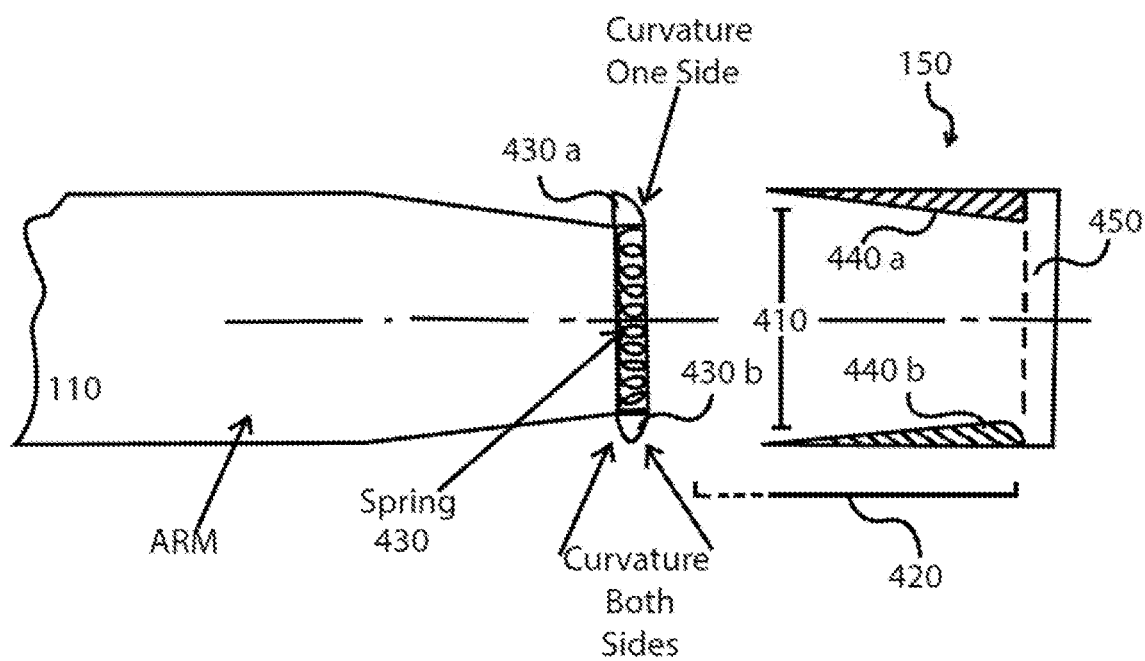
FIG. 4 illustrates a side sectional view of yet another locking mechanism for a modular eyeglass frame, in accordance with various embodiments.

FIG. 4 illustrates an example locking mechanism 140 for modular frame 100, consistent with various embodiments of the present disclosure. In this example, locking mechanism 140 may comprise, on strut 150: axial channel 420, slide opening 410, ramps 440a and 440b (respectively, untapered and tapered), and spring bar cavity 450; and on temple 110: spring bar 430 (having ends 430a and 430b—respectively, unidirectionally ramped and bidirectionally ramped). In this embodiment, modular frame 100 may couple together by inserting the anterior end of temple 110 into the slide opening 410 of strut 150, whereby both ends of spring tab 430 may compress and allow continued ingress. Continuing along that direction of travel until the spring bar 430 enters the spring bar cavity 450, the spring bar 430 will thusly be releasably locked into place by the immobility of unidirectionally ramped end 430a against untapered ramp 440a in the posterior direction. Temple 110 may be detached from strut 150 by torqueing temple 110 such that bidirectionally ramped end 430b slides over and disengages from tapered ramp 440b.

Figure 5:
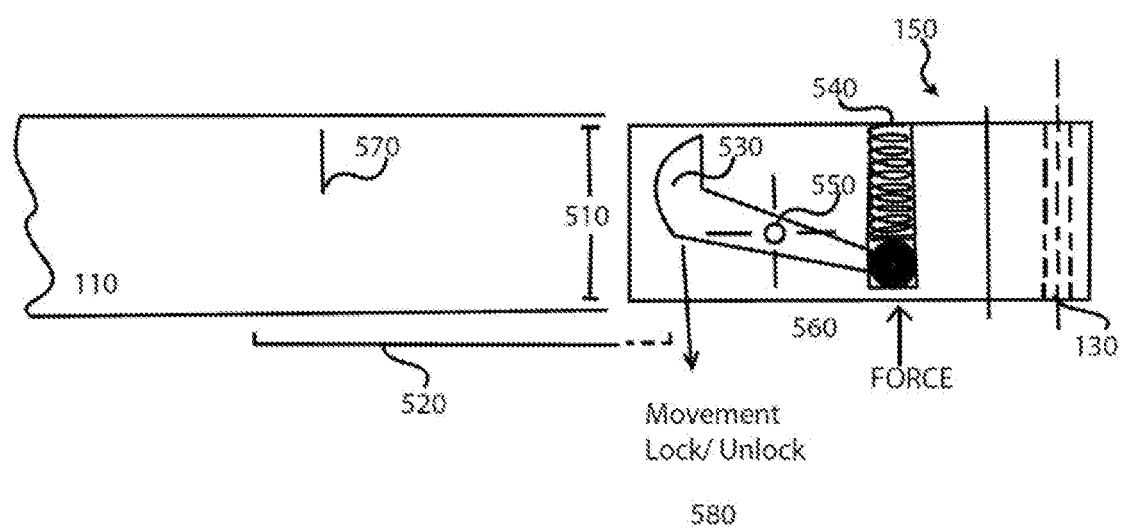
FIG. 5 illustrates a side sectional view of still another locking mechanism for a modular eyeglass frame, in accordance with various embodiments.

FIG. 5 illustrates an example locking mechanism (shown in FIG. 1 as 140) for modular frame 100, consistent with various embodiments of the present disclosure. In this example, locking mechanism 140 may comprise, on strut 150: latch 530, spring mechanism 540, pivot mechanism 550, and release mechanism 560 (collectively, spring latch assembly 580); and on temple 110: axial channel 520, slide opening 510, and catch mechanism 570. In this embodiment, modular frame 100 may couple together by inserting the posterior end of strut 150 into the slide opening 510 of temple 110, continuing along that direction of travel until latch 530 engages catch mechanism 570, releasably locking the components into place. Temple 110 may be detached from strut 150 by engaging the release mechanism 560, which compresses spring mechanism 540 so as to allow latch 530 to pivot about pivot mechanism 550 away from catch mechanism 570.

Figure 6:
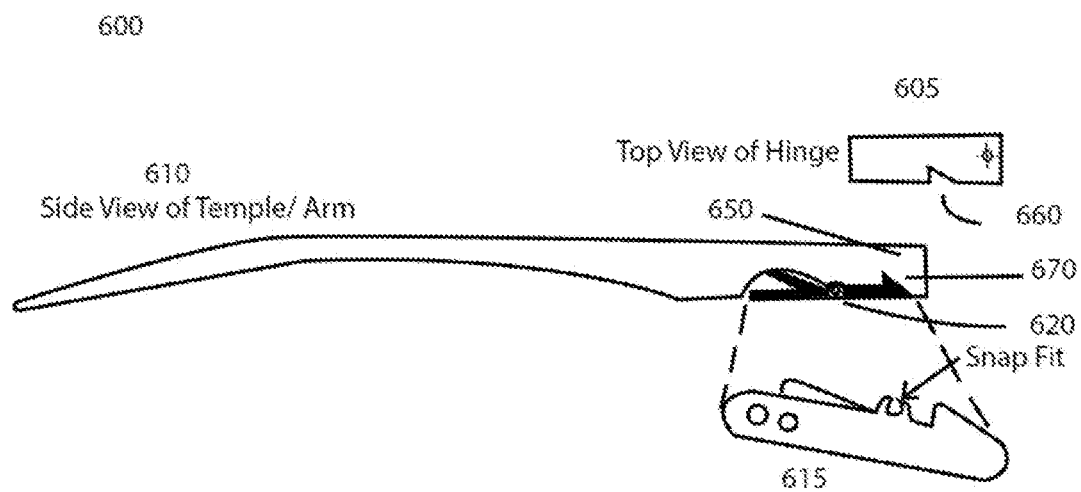
FIG. 6 illustrates a top plan view of a hinge and spring mechanism for a modular eyeglass frame with a side elevation exploded component view and hinge callout view, in accordance with various embodiments.

FIGS. 6-9 illustrate views of example hinge and spring mechanisms for modular frame 100, consistent with various embodiments of the present disclosure. For example, FIG. 6 depicts a hinge and spring mechanism 600 for modular frame 100, consistent with various embodiments of the present disclosure. In this example, a snap-fit spring clip 615 that may pivot about a pivot point 620 such that it may lock and release by engaging and disengaging a protruding notch element 670 of the snap-fit spring clip 615. The snap-fit spring clip 615 may be inserted into temple arm 610. The snap-fit spring clip 615 may fit into a recess 660. The snap-fit spring clip may fit adjoin the temple 610 to the hinge or attachment part 605 which is fixed to the modular frame 100. Such a system may incorporate a spring mechanism into the snap-fit spring clip 615 itself. Such a spring mechanism may feature a curved surface on the temple 610 against which the spring clip assembly may slide when depressed. In order to lock the temple 610 in place, the hinge 605 may be inserted into the cavity end 650 of the temple arm 610.

Figure 7:
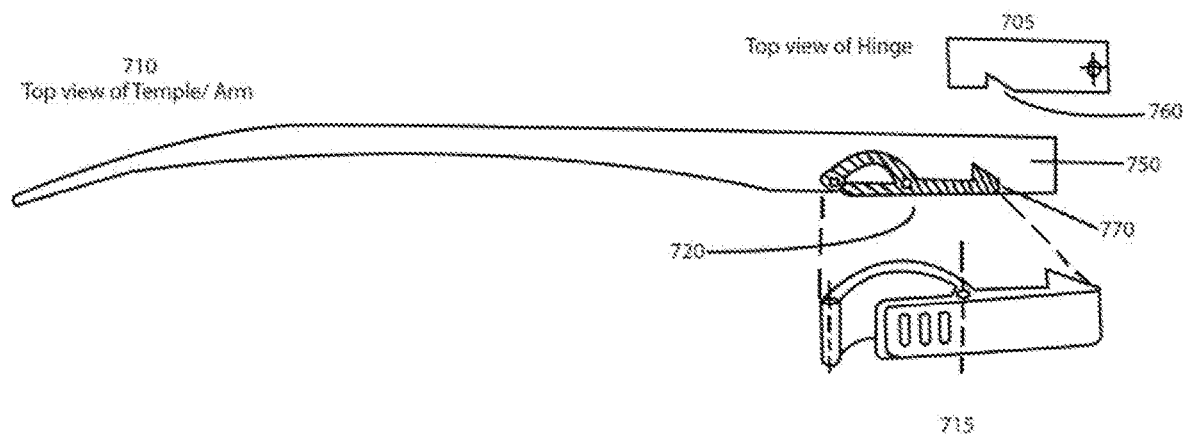
FIG. 7 illustrates a top plan view of another hinge and spring mechanism for a modular eyeglass frame with a perspective exploded component view and hinge callout view, in accordance with various embodiments.

For another example, FIG. 7 depicts a hinge and spring mechanism 700 for modular frame 100 (as pictured in FIG. 1), consistent with various embodiments of the present disclosure. In this example, a spring-like unibody hinge clip 715 may be screwed into a temple arm 710 at a pivot point 720. The attachment part or hinge 705 may have a recess 760. The spring-like unibody hinge clip 715 may lock in place of the temple arm 710 within the modular frame 100. The locking in place may happen once the attachment part or hinge 705 attached to the modular frame 100 may be inserted into an open cavity 750 of the temple arm 710. The spring-like unibody hinge clip 715 may slide along the hinge 705. Furthermore, three spring-like unibody hinge clip 715 may lock and release by engaging and disengaging a protruding notch element 770 within a recess 760 of the attachment part or hinge 705 attached to the modular frame 100.

Figure 8:
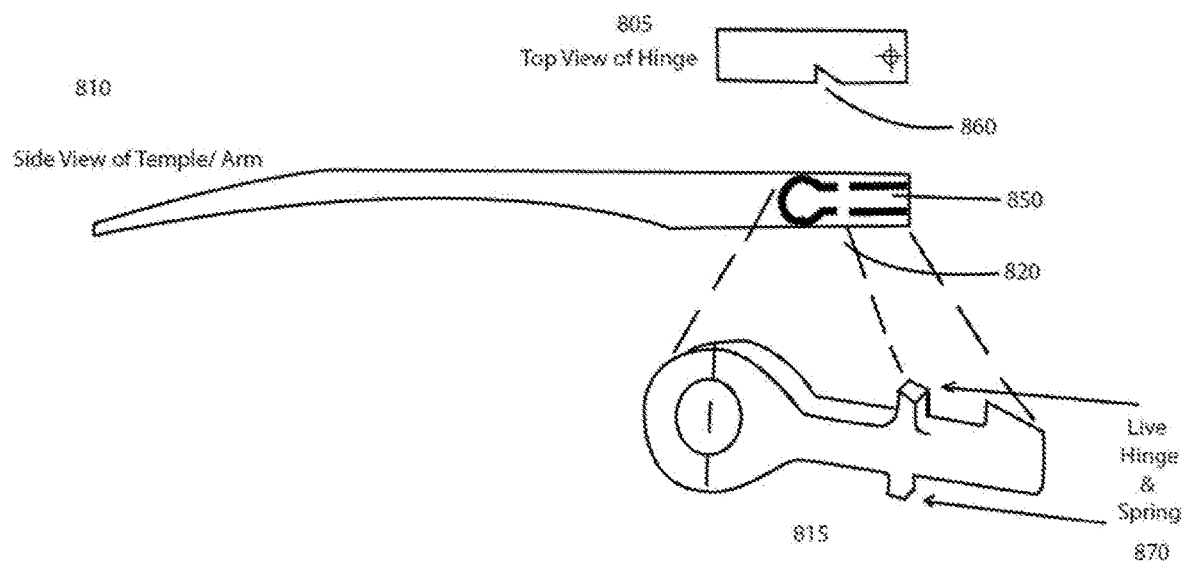
FIG. 8 illustrates a top plan view of yet another hinge and spring mechanism for a modular eyeglass frame with a perspective exploded component view and hinge callout view, in accordance with various embodiments.

For yet another example, FIG. 8 depicts a hinge and spring mechanism 800 for modular frame 100, consistent with various embodiments of the present disclosure. In this example, a complementary-shape hinge clip 815 that may interlock systems of protrusions (and/or similar features) with corresponding systems of indentations or channels (and/or similar features) (simply a "complementary-shape hinge notch") 820 found on a temple arm 810 of modular frame 100. Such a system may, be need not necessarily, involve engaging and disengaging a protruding element from a notch as part of its lock and release action. FIG. 8, 805 illustrates a top view of the complementary-shape hinge clip 815. Complementary-shape hinge clip 815 may be fixed to temple arm 810 via pivot point 820. Complementary-shape hinge clip 815 may lock and release by engaging and disengaging a protruding notch element 870 of the complementary-shape hinge clip 815 which is fixed on the temple arm 810 with a recess 860 of the hinge or attachment part 805 which is fixed to the modular frame 100.

Figure 9:
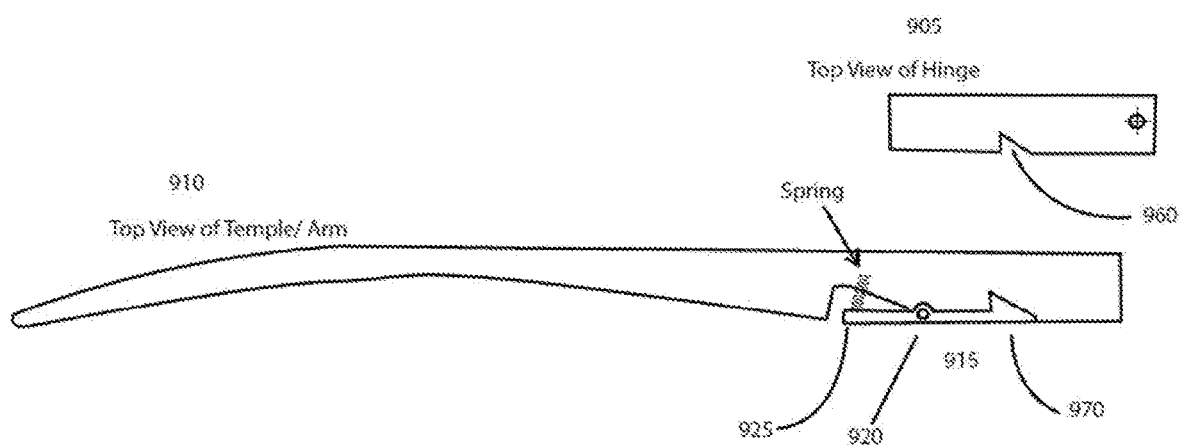
FIG. 9 illustrates a top plan view of still another a hinge and spring mechanism for a modular eyeglass frame with a hinge callout view, in accordance with various embodiments.

For still another example, FIG. 9 depicts a hinge and spring mechanism 900 for modular frame 100, consistent with various embodiments of the present disclosure. In this example, a spring pivot mechanism 915 with a lever element that may pivot about a pivot point, and may lock and release by engaging and disengaging a protruding element from a notch (simply a "spring pivot notch" or a "pivot point") 920 found on a temple arm 910 of modular frame 100. Such a system may incorporate a spring mechanism attached to the lever element so as to resist downward depression (i.e. the mode of action to release). FIG. 9, 905 illustrates a top view of the spring pivot mechanism 915. Spring pivot mechanism 915 may be fixed to temple arm 910 via pivot point 920. Spring pivot mechanism 915 may lock and release by engaging and disengaging a protruding notch element 970 of the spring pivot mechanism 915 which is fixed on the temple arm 910 with a recess 960 of the hinge or attachment part 905 which is fixed to the modular frame 100.

Figure 10:
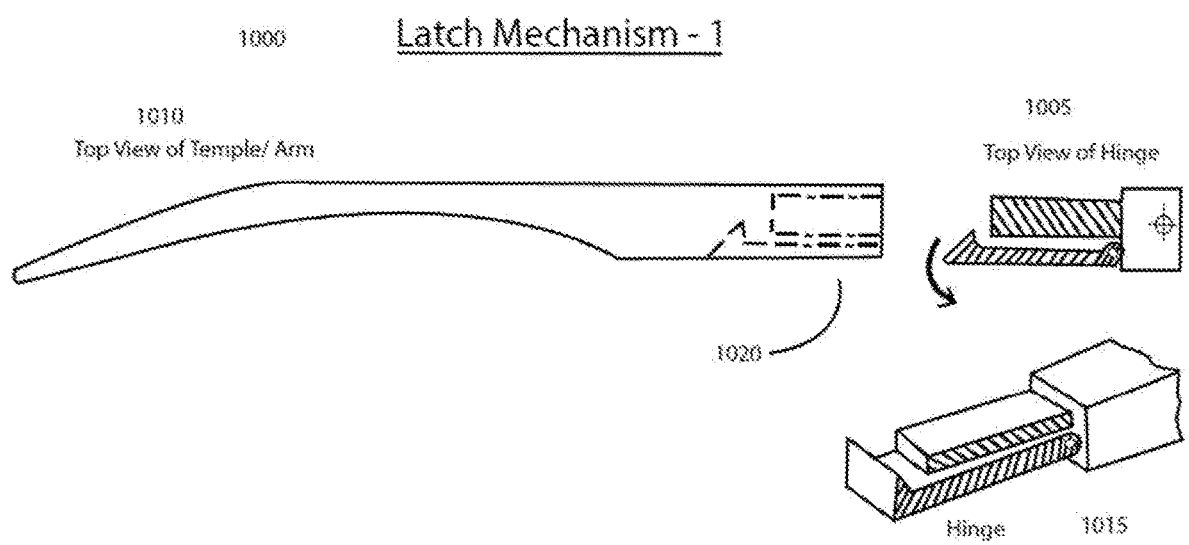
FIG. 10 illustrates a top plan view of a latch mechanism for a modular eyeglass frame with a perspective exploded component view and hinge callout view, in accordance with various embodiments.

FIGS. 10-13 illustrate views of example latch mechanisms for modular frame 100, consistent with various embodiments of the present disclosure. For example, FIG. 10 depicts a latch mechanism 1000 for modular frame 100, consistent with various embodiments of the present disclosure. In this example, a guide pin and latch mechanism 1015 that may incorporate a rigid member to guide insertion in the correct orientation (and may provide additional stability), and may further incorporate a latch mechanism that may lock and release by engaging and disengaging a protruding element from a notch (simply a "guide pin latch notch") 1020 found on a temple arm 1010 of a modular frame 100. Such a system may incorporate a flexible unibody latch. Alternatively or in addition, such a system may incorporate a hinged latch. A hinged latch may pivot about a pivot point near the base of a guide pin. FIG. 10, 1005 illustrates a top view of the guide pin hinge 1015.

Figure 11:
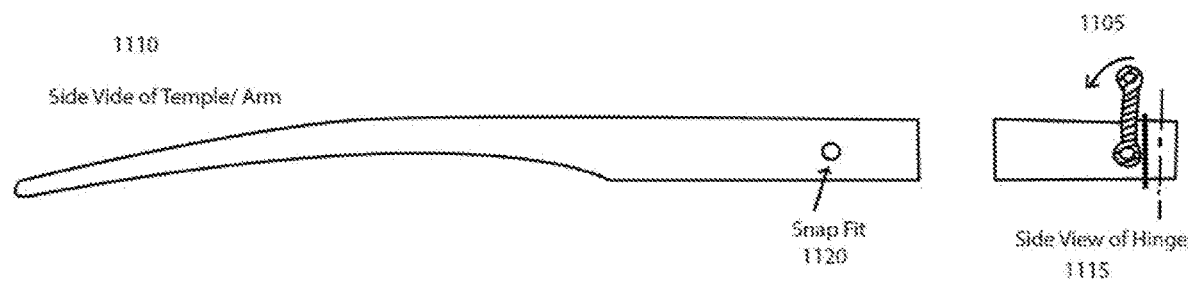
FIG. 11 illustrates a side view of another latch mechanism for a modular eyeglass frame with a hinge callout view, in accordance with various embodiments.

For another example, FIG. 11 depicts a latch mechanism 1100 for modular frame 100, consistent with various embodiments of the present disclosure. In this example, a snap-fit pivot latch 1105 that may incorporate a snap-fit element that may be attached to and pivot about a pivot point, and may lock and release by snapping the snap-fit element into a corresponding receiving cavity (simply a "snap fit pivot latch cavity") 1120 found on a temple arm 1110 of a modular frame 100. FIG. 11, 1115 illustrates a side view of the snap fit pivot latch hinge 1105.

Figure 12:
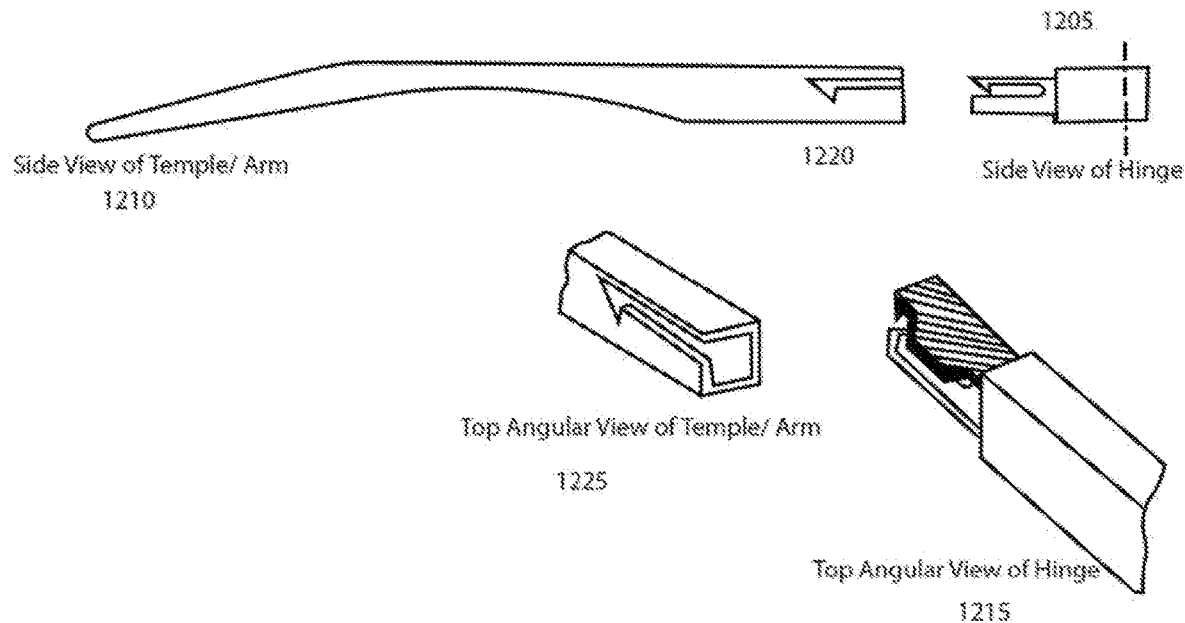
FIG. 12 illustrates a side view of a yet another latch mechanism for a modular eyeglass frame with various hinge and temple callout views, in accordance with various embodiments.

For another example, FIG. 12 depicts a latch mechanism 1200 for modular frame 100, consistent with various embodiments of the present disclosure. In this example, a complementary-shape latch mechanism 1215 that may employ a series of interfacing grooves, channels, protrusions, and notches to slide into place, lock, and release various components. The complementary-shape latch mechanism 1215 may fit in a notch (simply a "complementary-shape latch notch") 1220 found on a temple arm 1210 of a modular frame 100. FIG. 12, 1205 illustrates a side view of the complementary-shape latch mechanism 1215. FIG. 12, 1225 illustrates a top angular view of the temple arm.

Figure 13:
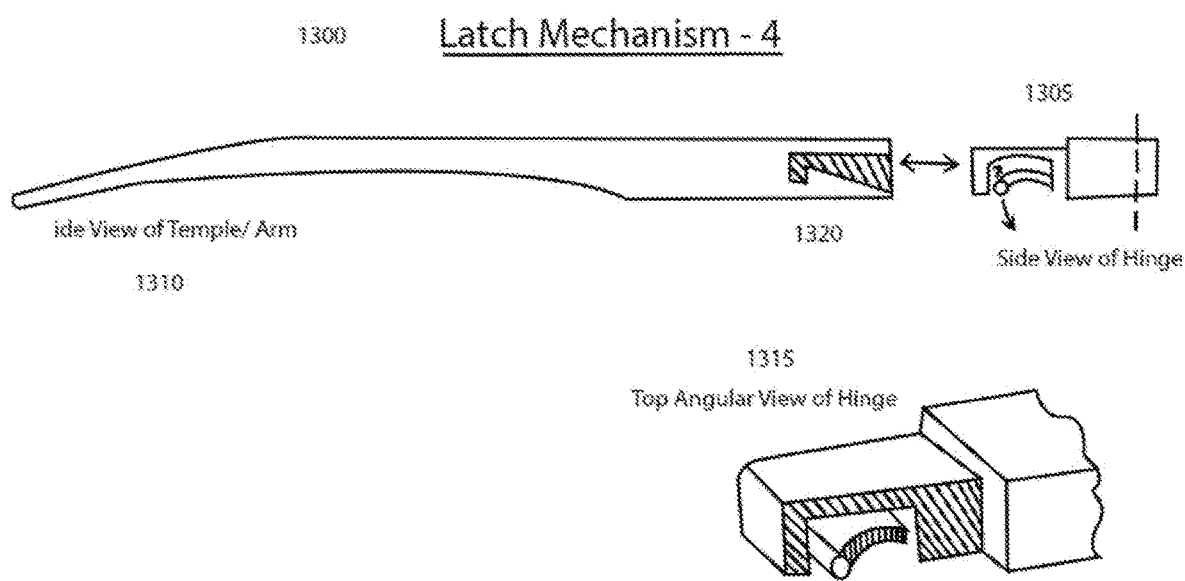
FIG. 13 illustrates a side view of a still another latch mechanism for a modular eyeglass frame with various hinge callout views, in accordance with various embodiments.

For another example, FIG. 13 depicts a latch mechanism 1300 for modular frame 100, consistent with various embodiments of the present disclosure. In this example, a nested latch mechanism 1315 that may combine or incorporate into a guide pin or support member a latching mechanism. Such a latching mechanism may employ a flexible unibody latch that can releasably engage a catch mechanism (simply a "nested latch catch") 1320 found on a temple arm 1310 of a modular frame 100. Such a system may have a mode of action to release of torqueing one of the locked components with respect to the other. FIG. 13, 1305 illustrates a side view of the nested latch mechanism 1315.

Figure 14:
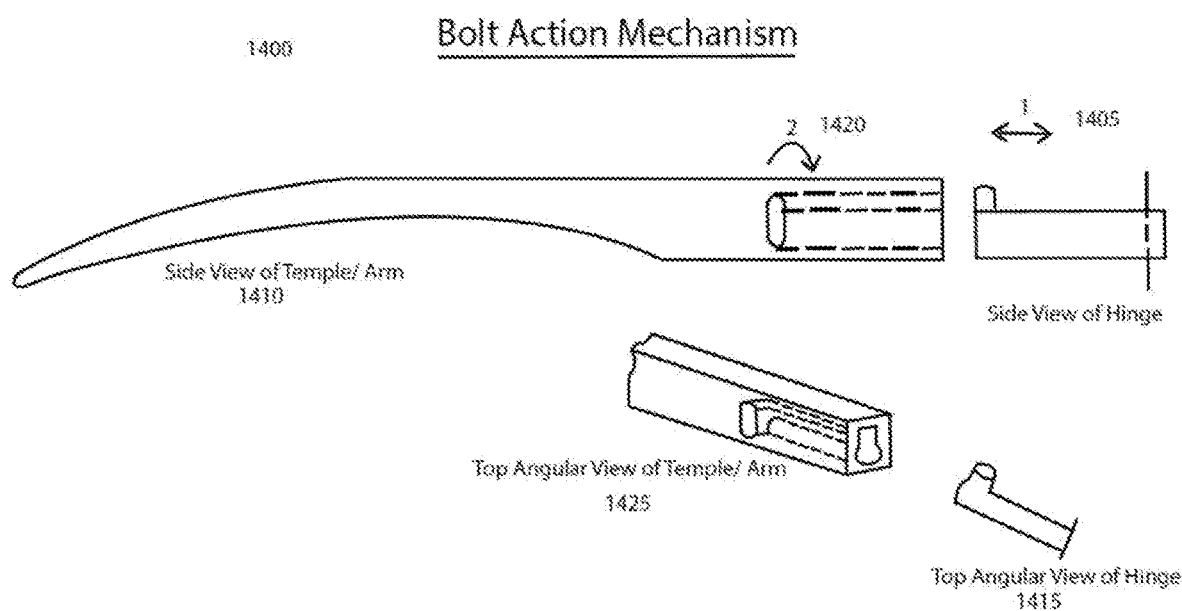
FIG. 14 illustrates a side view of bolt-action mechanism for a modular eyeglass frame with various hinge and temple callout views, in accordance with various embodiments.

FIG. 14 illustrates a bolt-action mechanism 1400 for modular frame 100, consistent with various embodiments of the present disclosure. A bolt-action mechanism 1400 may incorporate a shaped bolt 1415 that may slide through a receiving cavity 1420 in one or more preferential orientations, and upon reaching the end of ingress, may lock by twisting the shaped bolt with respect to the cavity about the axial axis in order to orient the shaped bolt (which may include a protrusion thereon) in a locked orientation that prevents egress. Such a system may release by twisting the shaped bolt with respect to the cavity about the axial axis in order to orient the shaped bolt in an unlocked orientation that allows egress. FIG. 14, 1405 illustrates a side view of the bolt-action mechanism 1415. FIG. 14, 1425 illustrates a top angular view of the temple arm.

Figure 15:
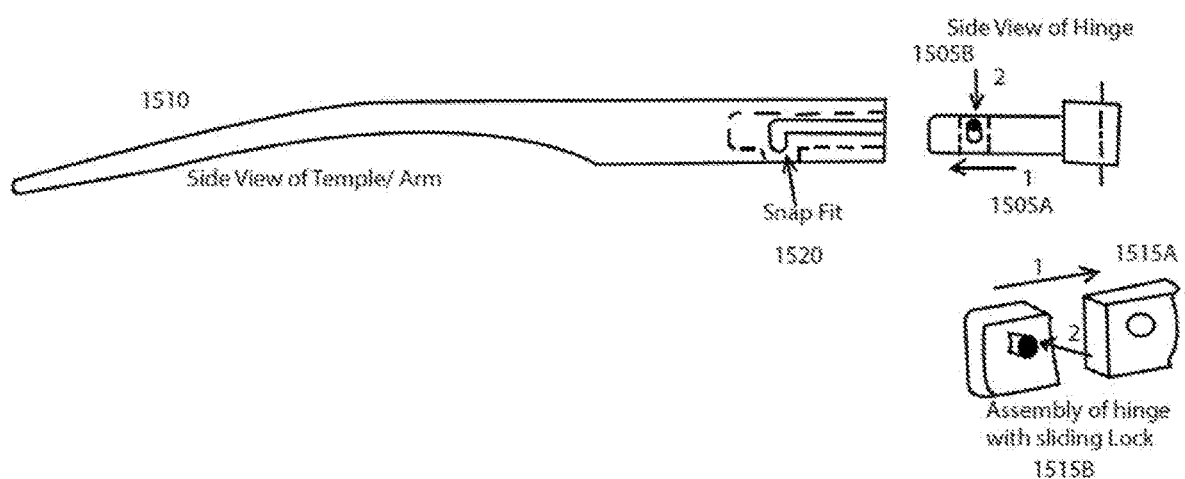
FIG. 15 illustrates a side view of a sliding lock mechanism for a modular eyeglass frame with various hinge callout views, in accordance with various embodiments.

FIG. 15 illustrates a snap-fit sliding lock 1500 for modular frame 100, consistent with various embodiments of the present disclosure. A snap-fit sliding lock may incorporate a lock-equipped member 1515 that may slide into place and snap into a locked position 1520. FIG. 15, 1505A illustrates horizontal sliding function from a side view of the snap-fit sliding mechanism; FIG. 15, 1505B illustrates vertical sliding function from a side view of the snap-fit sliding mechanism. 1515. FIG. 15, 1515A illustrates a horizontal sliding function assembly of the hinge with a sliding locking mechanism; FIG. 15, 1515B illustrates a snapping function on the assembly of the hinge with the snap-fit sliding locking mechanism.

Figure 16A:
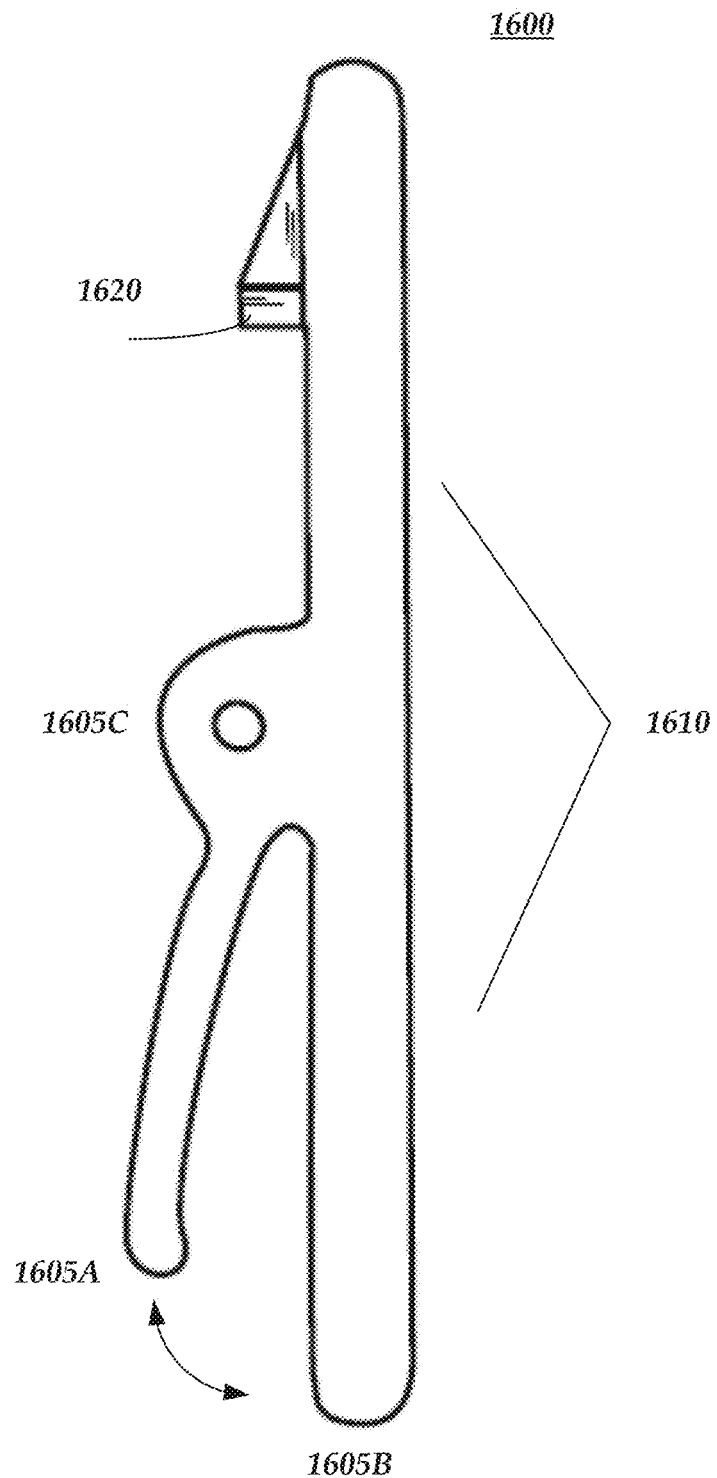
FIG. 16A illustrates a side plan view of a spring clip assembly for a modular eyeglass frame with various hinge callout views, in accordance with various embodiments.
Figure 16B:
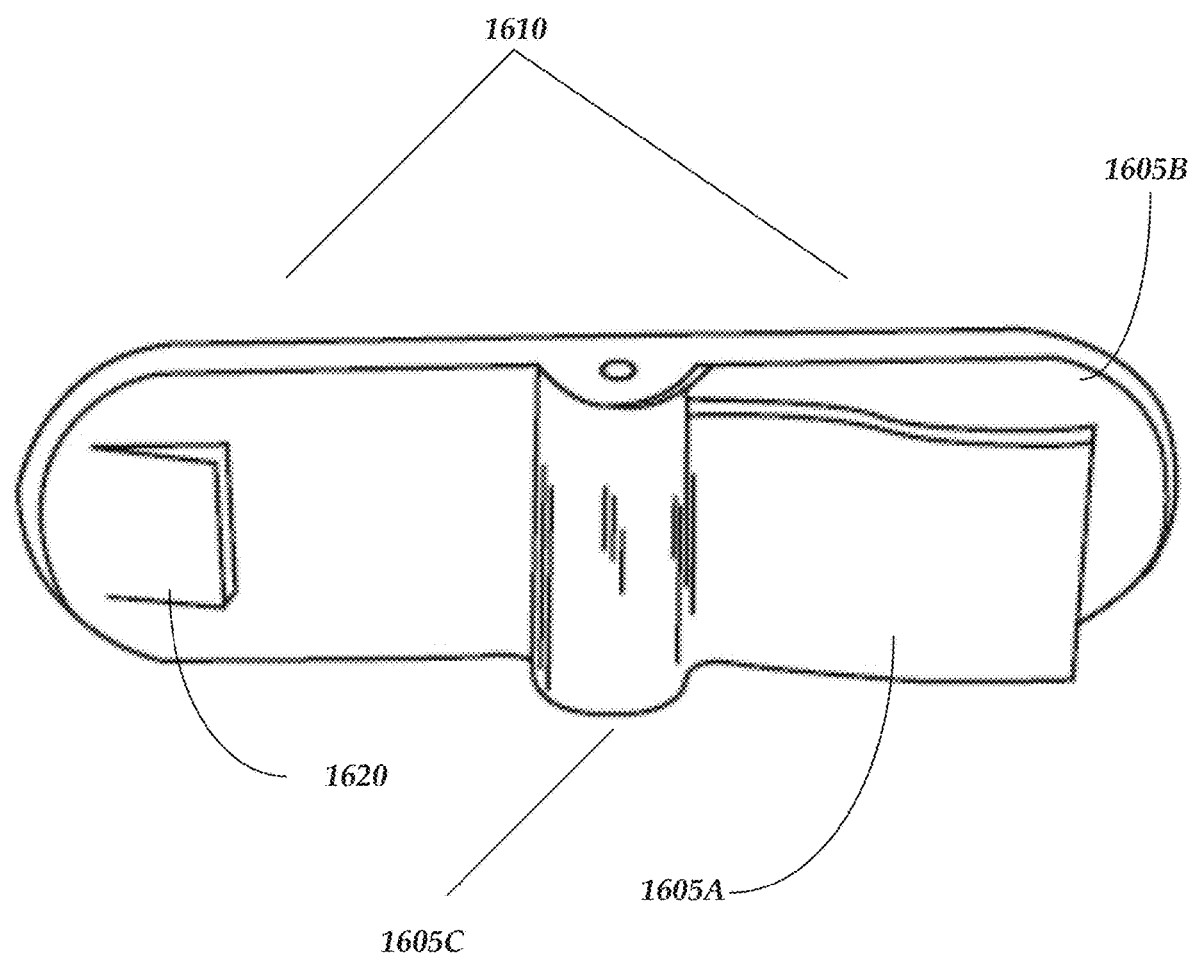
FIG. 16B illustrates a perspective view of a spring clip assembly for a modular eyeglass frame with various hinge callout views, in accordance with various embodiments.

FIG. 16A illustrates a side plan view of a spring clip assembly 1600 for a modular eyeglass frame 100. FIG. 16, 1605A illustrates a curved flexible lower arm of the spring clip assembly; FIG. 16, 1605B illustrates a horizontal upper arm of the spring clip assembly; FIG. 16, 1605C illustrates an arched pivot point the spring clip assembly, the arched pivot point having a circular aperture at the vertex of the arc. The curved double-sided arrow between 1605A and 1605B indicates the closing motion necessary to depress the curved flexible lower arm of the spring clip assembly 1605A for engaging into a receptacle of the modular eyeglass frame 100. FIG. 16, 1610 illustrates the side of the spring clip that is visible on the outside face of the temple arm when attached to a modular eyeglass frame 100. FIG. 16, 1620 illustrates a protruding notch element on the spring clip which engages or disengages into the recess cavity of a temple arm of modular eyeglass frame 100. FIG. 16B illustrates a perspective view of a spring clip assembly 1600 for a modular eyeglass frame 100.

Figure 17:
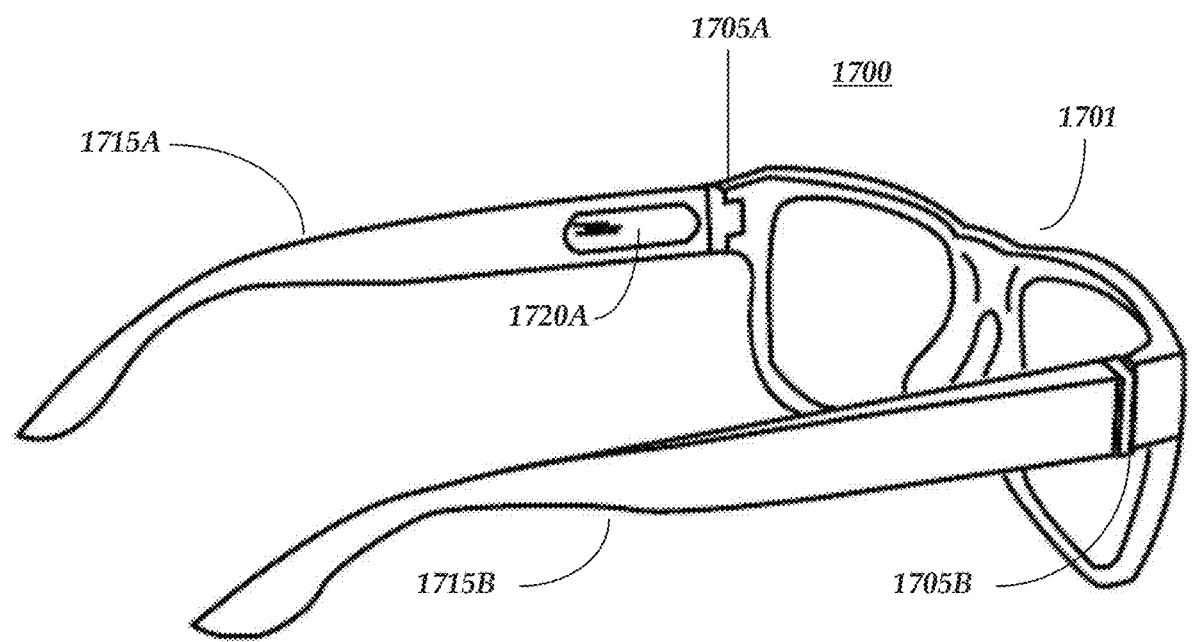
FIG. 17 illustrates a perspective view of a modular eyeglass frame in accordance with various embodiments of the present disclosure.

FIG. 17 illustrates a perspective view of a modular eyeglass frame 1700 in accordance with various embodiments of the present disclosure. FIG. 17 shows the modular eyeglass frame 1700 after the temple strut apparatuses 1715A (a left temple strut apparatus or earpiece) and 1715B

(a right temple strut apparatus or earpiece) have been attached via the attachment parts 1705A (a left attachment part or hinge) and 1705B (a right attachment part or hinge). FIG. 17, 1701 illustrates a lens assembly or frame of the modular eyeglass frame 1700. FIG. 17, 1720A illustrates a left locking mechanism assembly inserted into a pivot point of the modular eyeglass frame 1700.

Figure 18:
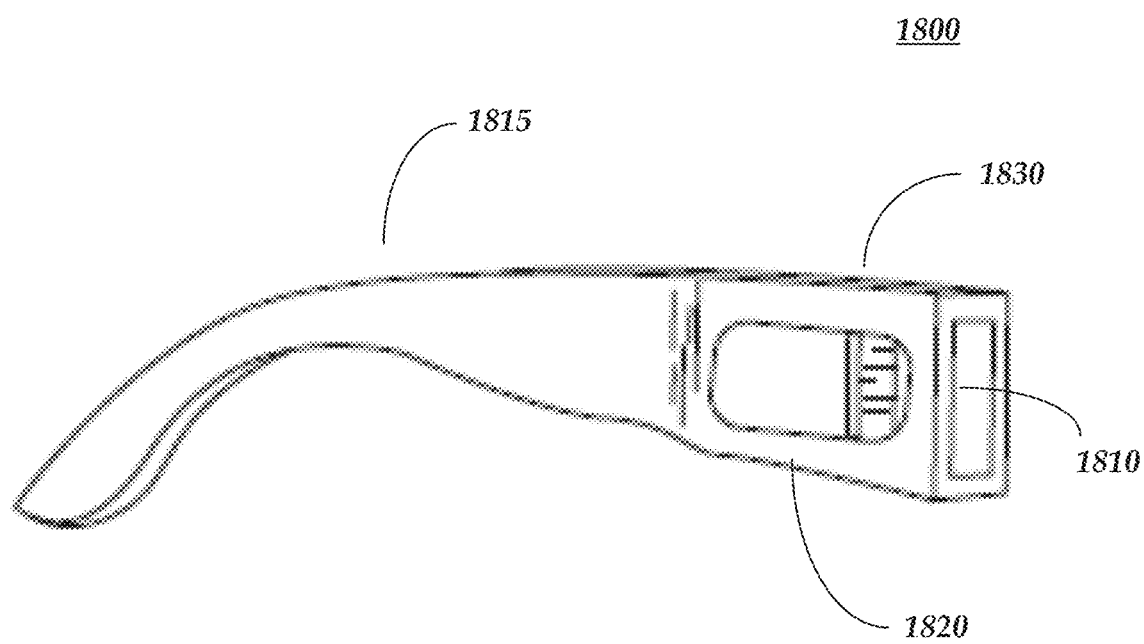
FIG. 18 illustrates a left temple view of an apparatus for a modular eyeglass frame with various hinge and attachment part callouts, in accordance with various embodiments.

FIG. 18 illustrates a left isometric view of a left temple strut apparatus 1800 for modular eyeglass frame 100. FIG. 18, 1810 illustrates a notch, cavity, or attachment part receptacle which may house one or more locking mechanisms or fastening mechanisms that may be used to attach the temple arm component 1815 of the temple strut apparatus 1800. FIG. 18, 1820 illustrates a pivot point of the temple strut apparatus 1800. FIG. 18, 1830 illustrates a cavity end of temple arm component 1815 of the temple strut apparatus 1800.

Figure 19:
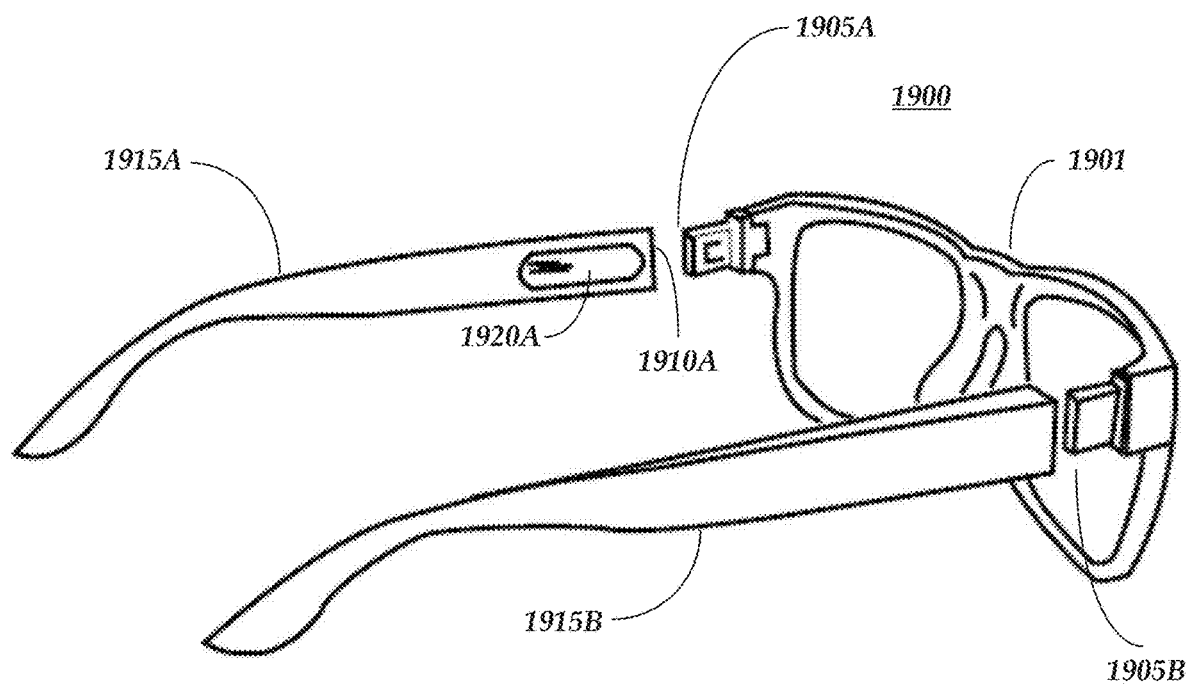
FIG. 19 illustrates a perspective view of an apparatus before attaching for a modular eyeglass frame in accordance with various embodiments of the present disclosure.

FIG. 19 illustrates a perspective view of a modular eyeglass frame 1900 in accordance with various embodiments of the present disclosure. FIG. 19 shows the modular eyeglass frame 1900 detached from the temple strut apparatuses 1915A (a left temple strut apparatus or earpiece) and 1915B (a right temple strut apparatus or earpiece) via the attachment parts 1905A (a left attachment part or hinge) and 1905B (a right attachment part or hinge). FIG. 19, 1901 illustrates a lens assembly or frame of the modular eyeglass frame 1900. FIG. 19, 1920A illustrates a left locking mechanism assembly 1600 inserted into a pivot point of the modular eyeglass frame 1900. FIG. 19, 1910A illustrates a notch, cavity, or attachment part receptacle which may house one or more locking mechanisms or fastening mechanisms that may be used to attach the temple arm component 1915A of the temple strut apparatus 1900.

Figure 20:
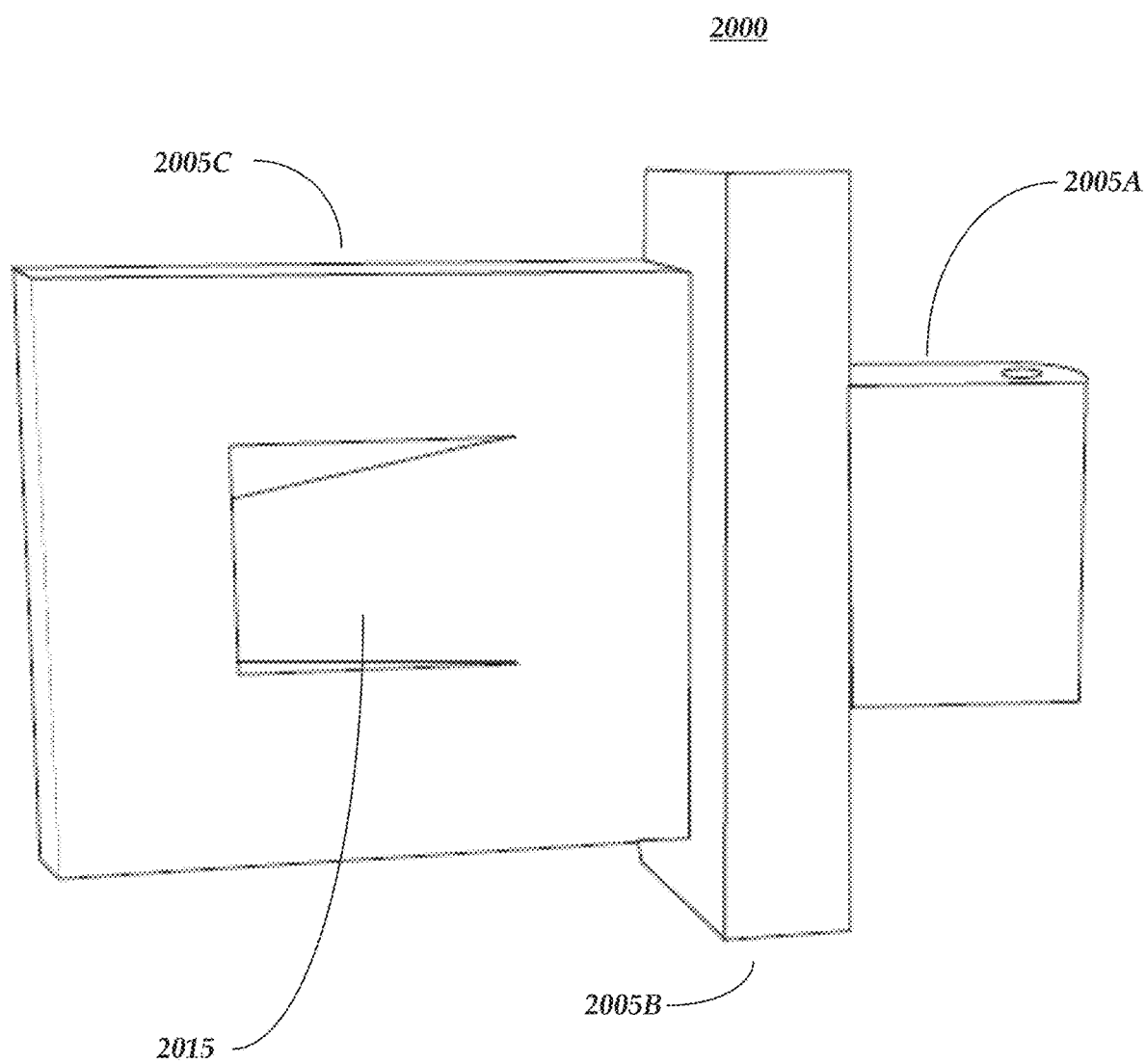
FIG. 20 illustrates a view of a hinge mechanism for a modular eyeglass frame in accordance with various embodiments of the present disclosure.

FIG. 20 illustrates a view of an attachment part, hinge, or modular eyeglass frame attachment apparatus 2000 for a modular eyeglass frame 100 in accordance with various embodiments of the present disclosure. FIG. 20 shows the modular eyeglass frame attachment apparatus 2000 which comprises hinge attachment components in accordance with the present disclosure. FIG. 20, 2005A illustrates a hinge attachment component of the modular eyeglass frame 100; FIG. 20, 2005B illustrates a part of the hinge attachment component 2005B which the temple rests against after inserting attachment part or hinge into the temple strut apparatus of the modular eyeglass frame 100; FIG. 20, 2015 illustrates a recessed section of the hinge attachment component which accommodates the protruding notch element of the one or more locking mechanisms including but not limited to a spring clip locking mechanism of the modular eyeglass frame 100.

Figure 21:
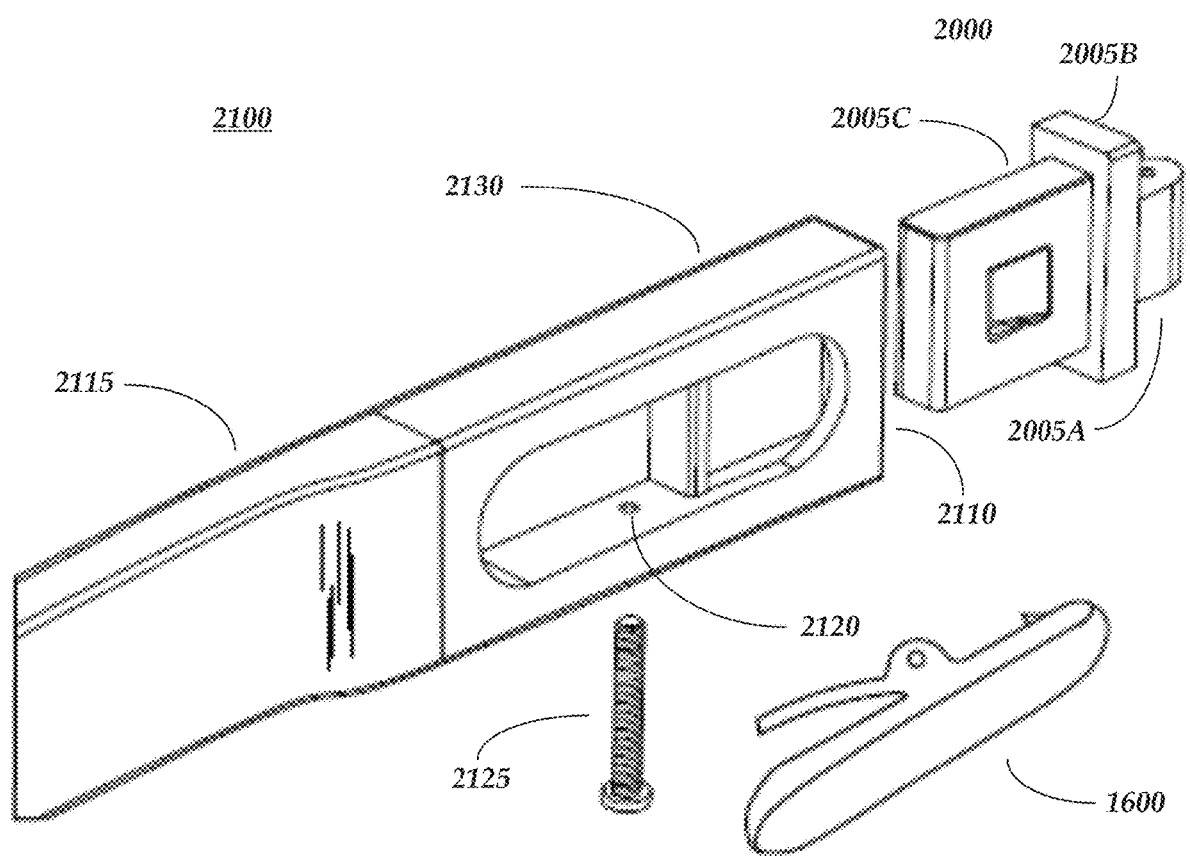
FIG. 21 illustrates a side plan view of a detached lock mechanism for a modular eyeglass frame with various hinge callout views, in accordance with various embodiments.

FIG. 21 illustrates a side plan view of a detached lock mechanism of a temple strut 2100 for a modular eyeglass frame 100 in accordance with various embodiments of the present disclosure. FIG. 21 shows the modular eyeglass frame temple strut apparatus 2100. FIG. 21, 2000 illustrates an attachment part, hinge, or modular eyeglass frame attachment apparatus 2000 comprising components 2005A, 2005B, and 2005C. FIG. 21, 2110 illustrates a cavity component for a spring clip locking mechanism; FIG. 21, 2115 illustrates a rear temple strut component; FIG. 21, 2120 illustrates a pivot point for a temple strut locking mechanism receptacle; FIG. 21, 2125 illustrates a screw component for the temple strut locking mechanism receptacle. FIG. 21, 1600 illustrates a spring clip assembly 1600 for a modular eyeglass frame 100 detached from a recess 2130 of the fully attached temple strut apparatus 2100. Recess 2130 consists of two components, a first cavity component 2110 and a second cavity component which includes a pivot point 2120 wherein the first cavity component and the second cavity component are separated by a stop wall at the rear of the first cavity component configured to maintain the structural integrity of the temple strut apparatus. FIG. 21, 2115 illustrates an earpiece or temple tip of modular eyeglass frame 100.

Figure 22:
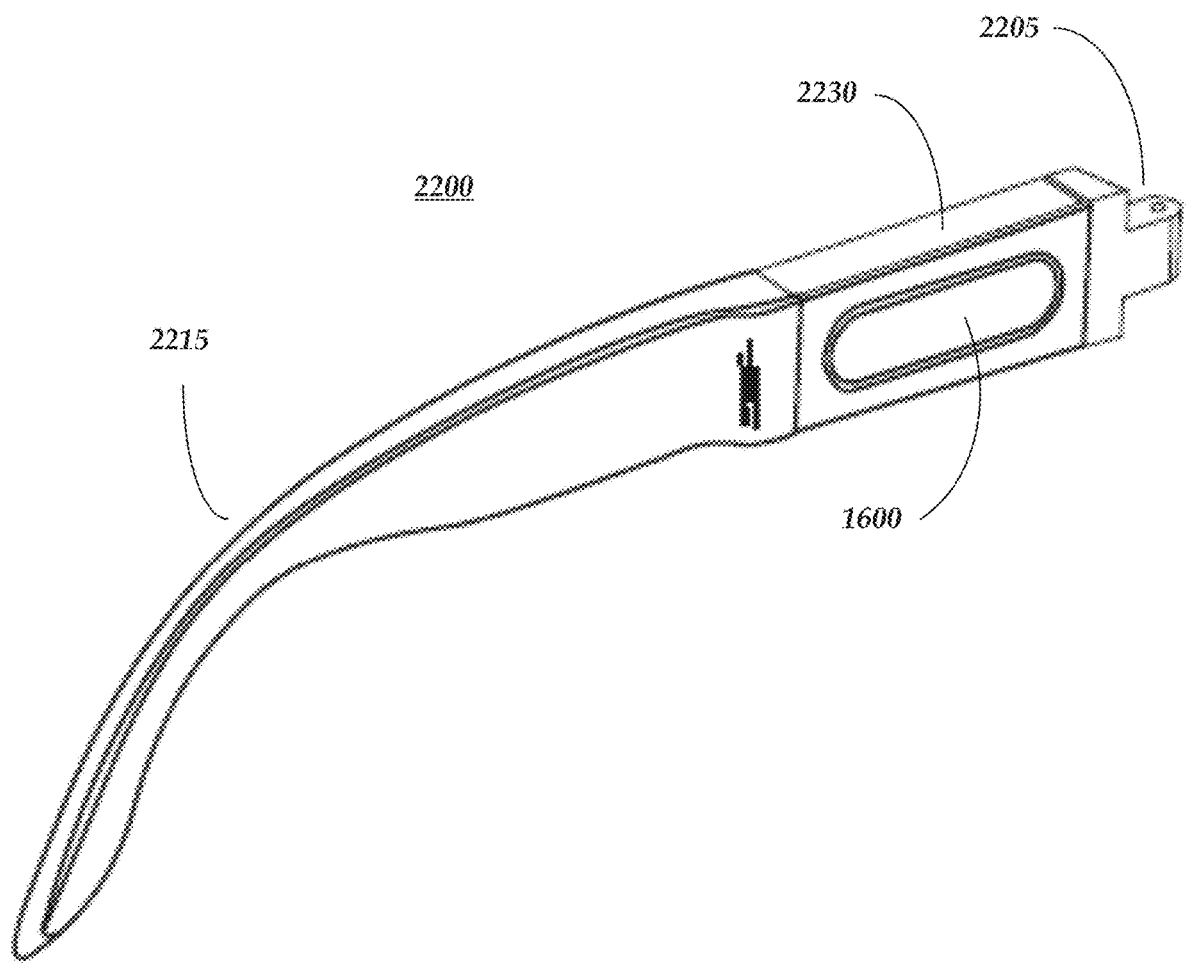
FIG. 22 illustrates a side plan view of an attached temple clip hinge for a modular eyeglass frame with various hinge callout views, in accordance with various embodiments.

FIG. 22, 2200 illustrates a side plan view of an attached temple clip hinge for a modular eyeglass frame 100. FIG. 22, 2205 illustrates a hinge and attachment part component in a locked position fully inserted into the temple arm 2215. FIG. 22, 1600 illustrates a spring clip assembly 1600 for a modular eyeglass frame 100 fully inserted into a recess 2230 of the fully attached temple strut apparatus 2200. FIG. 22, 2215 illustrates an earpiece or temple tip of modular eyeglass frame 100.

II. Aspects

The following disclose various Aspects of the present disclosure. The various Aspects are not to be construed as patent claims unless the language of the Aspect appears as a patent claim. The Aspects describe various non-limiting embodiments of the present disclosure.

Aspect 1. A modular eyeglass frame comprising:

A lens assembly comprising:

a frame; and at least one end piece;

A detachable temple, the detachable temple having an anterior and a posterior end, the detachable temple being detachably fixable to the lens assembly at its anterior end; and A locking mechanism operative to detachably couple the detachable temple with the lens assembly, wherein the locking mechanism comprises at least one of:

a spring mechanism;
a tab;
a pin;
a bolt;
a protrusion;
a ramp;
a channel;
an opening;
a notch;
a depression;
a receiving cavity;
a hinge;
a ratchet;
a pawl;
a latch;
a hook;
a shaft;
a magnet;
a flexible member;
a snap-fit element;
a guiding mechanism;
a pivot mechanism; and
a ball detent.

Aspect 2. The apparatus of aspect 1, wherein the lens assembly comprises a temple strut having an anterior and a posterior end, the temple strut connected at its anterior end to the at least one end piece, wherein the detachable temple attaches at its anterior end to the posterior end of the temple strut.

Aspect 3. The apparatus of aspect 2, wherein the modular eyeglass frame further comprises:

a spring tab assembly protruding from a surface of the temple strut, the spring tab assembly comprising:

a unidirectionally ramped tab having a ramped surface facing the posterior end of the temple strut and a base facing an interior cavity of the temple strut; and a spring mechanism fixed at one end to the base of the unidirectionally ramped tab and at the other end to an interior surface of the temple strut; and an axial channel situated below a surface of the detachable temple, the axial channel having a channel opening to a face of the detachable temple, wherein the detachable temple has a slide opening at its anterior end via which the detachable temple can slide over the posterior end of the temple strut towards the anterior end of the temple strut into a coupled configuration, further wherein the spring tab assembly is configured to slide through the axial channel as the detachable temple moves over the posterior end of the temple strut towards the anterior end of the temple strut, further wherein the spring assembly is configured to spring outward through the channel opening, acting as a locking mechanism against the detachable temple's movement away from the anterior end of the temple strut, further wherein the spring tab assembly is configured to enable decoupling of the detachable temple when the unidirectionally ramped tab is pressed inward toward the interior cavity of the temple strut.

Aspect 4. The apparatus of aspect 3, wherein at least one of the detachable temple and the temple strut is configured to prevent coupling between the detachable temple and the temple strut where the spring tab would slide along any path other than the axial channel.

Aspect 5. The apparatus of aspect 3, wherein the components present on the temple strut are switched for the components present on the detachable temple, and vice versa, further wherein the orientation of each such component with respect to anterior and posterior directions is reversed.

Aspect 6. The apparatus of aspect 2, wherein the modular eyeglass frame further comprises:

a latching protrusion positioned on the temple strut, the latching protrusion having a unidirectionally ramped surface facing the posterior end of the temple strut;

an axial channel situated below a surface of the detachable temple, the axial channel having a channel opening to a face of the detachable temple; and a spring lever situated on the detachable temple, the spring lever comprising:

a lever element;

a pivot mechanism; and a latch, wherein the latch is situated at the end of the axial channel nearest the posterior end of the detachable temple, wherein the detachable temple has a slide opening at its anterior end via which the detachable temple can slide over the posterior end of the temple strut towards the anterior end of the temple strut into a coupled configuration, further wherein the latching protrusion is configured to slide through the axial channel as the detachable temple moves over the posterior end of the temple strut towards the anterior end of the temple strut, further wherein the spring lever is configured to engage the latching protrusion, acting as a locking mechanism against the detachable temple's movement away from the anterior end of the temple strut, further wherein the spring lever is configured to enable decoupling of the detachable temple when the lever element is actuated.

Aspect 7. The apparatus of aspect 7, wherein at least one of the detachable temple and the temple strut is configured to prevent coupling between the detachable temple and the temple strut where the latching protrusion would slide along any path other than the axial channel.

Aspect 8. The apparatus of aspect 7, wherein the components present on the temple strut are switched for the components present on the detachable temple, and vice versa, further wherein the orientation of each component with respect to anterior and posterior directions is reversed.

Aspect 9. The apparatus of aspect 2, wherein the modular eyeglass frame further comprises:

a spring bar positioned on the anterior end of the detachable temple, the spring bar comprising:

a bidirectionally ramped end;

a unidirectionally ramped end; and a spring mechanism; and an axial channel situated in the interior cavity of the temple strut, the axial channel comprising:

a tapered ramp configured to receive couple with the bidirectionally ramped end of a spring bar;

an untapered ramp configured to couple with the unidirectionally ramped end of a spring bar; and a spring bar cavity configured to receive a spring bar, wherein the temple strut has a slide opening at its posterior end via which the temple strut can slide over the anterior end of the detachable temple towards the posterior end of the detachable temple into a coupled configuration, further wherein the spring bar is configured to slide through the axial channel over the tapered ramp and untapered ramp as the temple strut moves over the anterior end of the detachable temple towards the posterior end of the detachable temple, further wherein the spring bar cavity is configured to engage the spring bar, acting as a locking mechanism against the detachable temple's movement away from the anterior end of the temple strut, further wherein the spring bar is configured to enable decoupling of the detachable temple when the detachable temple is manipulated so as to slide the bidirectionally ramped end of the spring bar over the tapered ramp.

Aspect 10. The apparatus of aspect 11, wherein at least one of the detachable temple and the temple strut is configured to prevent coupling between the detachable temple and the temple strut in any coupling orientation that would improperly couple the tapered ramp with the unidirectionally ramped end of the spring bar or the untapered end with the bidirectionally ramped end of the spring bar.

Aspect 11. The apparatus of aspect 11, wherein the components present on the temple strut are switched for the components present on the detachable temple, and vice versa, further wherein the orientation of each component with respect to anterior and posterior directions is reversed.

Aspect 12. The apparatus of aspect 2, wherein the modular eyeglass frame further comprises:

a spring latch assembly situated in the interior cavity of the temple strut, the spring latch assembly comprising:

a spring mechanism;

a latch coupled to the spring mechanism, the latch comprising:

a ramped end; and a pivot mechanism; and a release mechanism; and an axial channel inside the detachable temple, the axial channel comprising a catch mechanism, wherein the detachable temple has a slide opening at its anterior end via which the detachable temple can slide over the posterior end of the temple strut towards the anterior end of the temple strut into a coupled configuration, further wherein the spring latch is configured to travel through the axial channel until it releasably engages the catch mechanism;

further wherein the catch mechanism is configured to engage the spring latch, acting as a locking mechanism against the detachable temple's movement away from the anterior end of the temple strut, further wherein the release mechanism is configured to enable decoupling of the detachable temple when engaged, by actuating the spring mechanism.

Aspect 13. The apparatus of aspect 15, wherein at least one of the detachable temple and the temple strut is configured to prevent coupling between the detachable temple and the temple strut in any coupling orientation wherein the catch mechanism cannot engage the spring latch.

Aspect 14. The apparatus of aspect 15, wherein the components present on the temple strut are switched for the components present on the detachable temple, and vice versa, further wherein the orientation of each component with respect to anterior and posterior directions is reversed.

Aspect 15. The apparatus of aspect 2, wherein the at least one detachable temple comprises exactly two detachable temples.

Aspect 16. The apparatus of aspect 1, wherein the locking mechanism comprises at least one of:
 a snap-fit spring clip;
 a spring-like unibody hinge clip;
 a complementary-shape hinge clip;
 a spring pivot mechanism;
 a guide pin and latch mechanism;
 a flexible unibody latch;
 a snap-fit pivot latch;
 a complementary-shape latch mechanism;
 a nested latch mechanism;
 a bolt-action mechanism; and
 a snap-fit sliding lock.

Aspect 17. A method for retrofitting an eyeglass frame with a modular eyeglass frame system comprising:

removing, at each of one or more end pieces of the eyeglass frame, each of one or more non-detachable temples from its respective end piece;

affixing, at least one of the one or more end pieces, a temple strut, the temple strut having an anterior and a posterior end, the affixing performed between the at least one of the one or more end pieces and the anterior end of the temple strut;

attaching, at the posterior end of the temple strut, a detachable temple, the detachable temple having a locking mechanism, the attaching performed between the posterior end of the temple strut and the anterior end of the detachable temple; and engaging the locking mechanism.

Aspect 18. An apparatus comprising:
 a lens assembly having a removably insertable attachment component fixed to a hinge; and
 a removable temple having a notch receptacle and a holding mechanism.

Aspect 19. The apparatus of aspect 18 wherein the removably insertable attachment component fixed to a hinge further comprises at least one of a snap fit first component of a locking mechanism, a spring clip first component of a locking mechanism, a sliding lock first component of a locking mechanism, and a first component of a locking mechanism.

Aspect 20. The apparatus of aspect 19 further comprising:
 wherein the notch receptacle is configured to accept at least one of a snap fit first component of a locking mechanism, a spring clip first component of locking mechanism, a sliding lock first component of a locking mechanism, and a first component of a locking mechanism; and
 wherein the holding mechanism further comprises at least one of a snap fit second component of a locking mechanism, a spring clip second component of locking mechanism, a sliding lock second component of a locking mechanism, and a second component of a locking mechanism.

III. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A system comprising:
 a temple assembly comprising:
  an internal cavity having a first portion and a second portion,
   wherein the first portion forms a channel along at least a portion of a length of the temple assembly,
   wherein a wall subdivides the first portion from the second portion,
  a first opening at an end of the temple assembly for releasably receiving a temple strut into the channel of the first portion,
  a second opening at a side of the temple assembly for exposing at least a portion of the first portion and at least a portion of the second portion of the internal cavity, and
  a spring clip assembly configured to enclose the second opening, the spring clip assembly comprising:
   a fulcrum and lever configuration, and
   a clip positioned relative to a first edge of the lever, the clip being configured to be inserted into an indentation of the temple strut, and
   a spring mechanism is positioned relative to a second edge of the lever,
  wherein the spring clip assembly is configured to be attached to the temple assembly via a pin running through the temple assembly into the spring clip assembly, such that the clip and the spring mechanism are directed towards the internal cavity of the temple assembly,
  wherein the temple assembly is configurable in an open state and a closed state,
  wherein in the open state, the spring mechanism is depressed within the second portion of the internal cavity, wherein in the open state, a distal end of the spring mechanism is connected to the second edge of the lever, wherein in the closed state, the temple assembly is configured to releasably lock to an eyeglass lens assembly; and the eyeglass lens assembly comprising:
an eyeglass frame comprising the temple strut, wherein the temple strut is configured to be releasably inserted into the channel of the temple assembly via the first opening to the first portion of the internal cavity until an end of the temple strut reaches a final position adjacent to the wall subdividing the internal cavity, and
the indentation within a surface of the temple strut,
wherein, when releasably inserted, at least a portion of the indentation is exposed through the second opening of the temple assembly.

2. The system of claim 1, wherein the clip is oriented toward the first portion of the internal cavity and the spring mechanism is oriented toward the second portion of the internal cavity, when the spring clip assembly is attached to the temple assembly.

3. The system of claim 1, wherein in the open state, the clip is elevated out of the first portion of the internal cavity of the temple assembly.

4. The system of claim 1, wherein in the closed state, the spring mechanism is extended within the second portion of the internal cavity of the temple assembly.

5. The system of claim 1, wherein in the closed state, the clip is within the first portion of the internal cavity of the temple assembly.

6. The system of claim 1, wherein the insertion of the clip into the indentation causes the temple assembly to lock to the eyeglass lens assembly.

7. The system of claim 1, wherein the pin acts as the fulcrum in the fulcrum and lever configuration.

8. A system comprising:
a temple assembly comprising:
an internal cavity having a first portion and a second portion,
wherein the first portion forms a channel along at least a portion of a length of the temple assembly,
a first opening for receiving a temple strut into the channel of the first portion,
a second opening for exposing at least a portion of the first portion and at least a portion of the second portion of the internal cavity, and
a spring clip assembly configured to enclose the second opening, the spring clip assembly comprising:
a fulcrum and lever configuration,
a clip positioned relative to a first edge of the lever, wherein the clip is configured to be inserted into an indentation of the temple strut, and
a spring mechanism is positioned relative to a second edge of the lever,
wherein the spring clip assembly is configured to be attached to the temple assembly, such that the clip and the spring mechanism are directed towards the internal cavity of the temple assembly when the spring clip assembly is attached to the temple assembly,
wherein the spring clip assembly is configured to enclose the second opening,
wherein the spring clip assembly is configurable in an open state and a closed state,
wherein in the open state, the spring mechanism is depressed within the second portion of the internal cavity of the temple assembly, wherein in the open state, a distal end of the spring mechanism is connected to the second edge of the lever,
wherein in the closed state, the temple assembly is configured to releasably lock to an eyeglass lens assembly; and the eyeglass lens assembly comprising:
an eyeglass frame comprising the temple strut, wherein the temple strut configured to be releasably inserted into the channel of the temple assembly, and
the indentation within a surface of the temple strut,
wherein, when the temple strut is releasably inserted into the temple assembly, at least a portion of the indentation is exposed through the second opening of the temple assembly.

9. The system of claim 8, wherein the clip is oriented toward the first portion of the internal cavity and the spring mechanism is oriented toward the second portion of the internal cavity, when the spring clip assembly is attached to the temple assembly.

10. The system of claim 8, wherein in the open state, the clip is elevated out of the first portion of the internal cavity of the temple assembly.

11. The system of claim 8, wherein in the closed state, the spring mechanism is extended within the second portion of the internal cavity of the temple assembly.

12. The system of claim 8, wherein in the closed state, the clip is within the first portion of the internal cavity of the temple assembly.

13. The system of claim 8, wherein the insertion of the clip into the indentation causes the temple assembly to lock to the eyeglass lens assembly.

14. The system of claim 8, wherein a pin attaching the temple assembly to the spring clip assembly acts as the fulcrum in the fulcrum and lever configuration.

* * * * *